Feb. 26, 1963 G. C ELLERBECK 3,079,076
CALCULATING MACHINE
Filed April 11, 1960 10 Sheets-Sheet 1
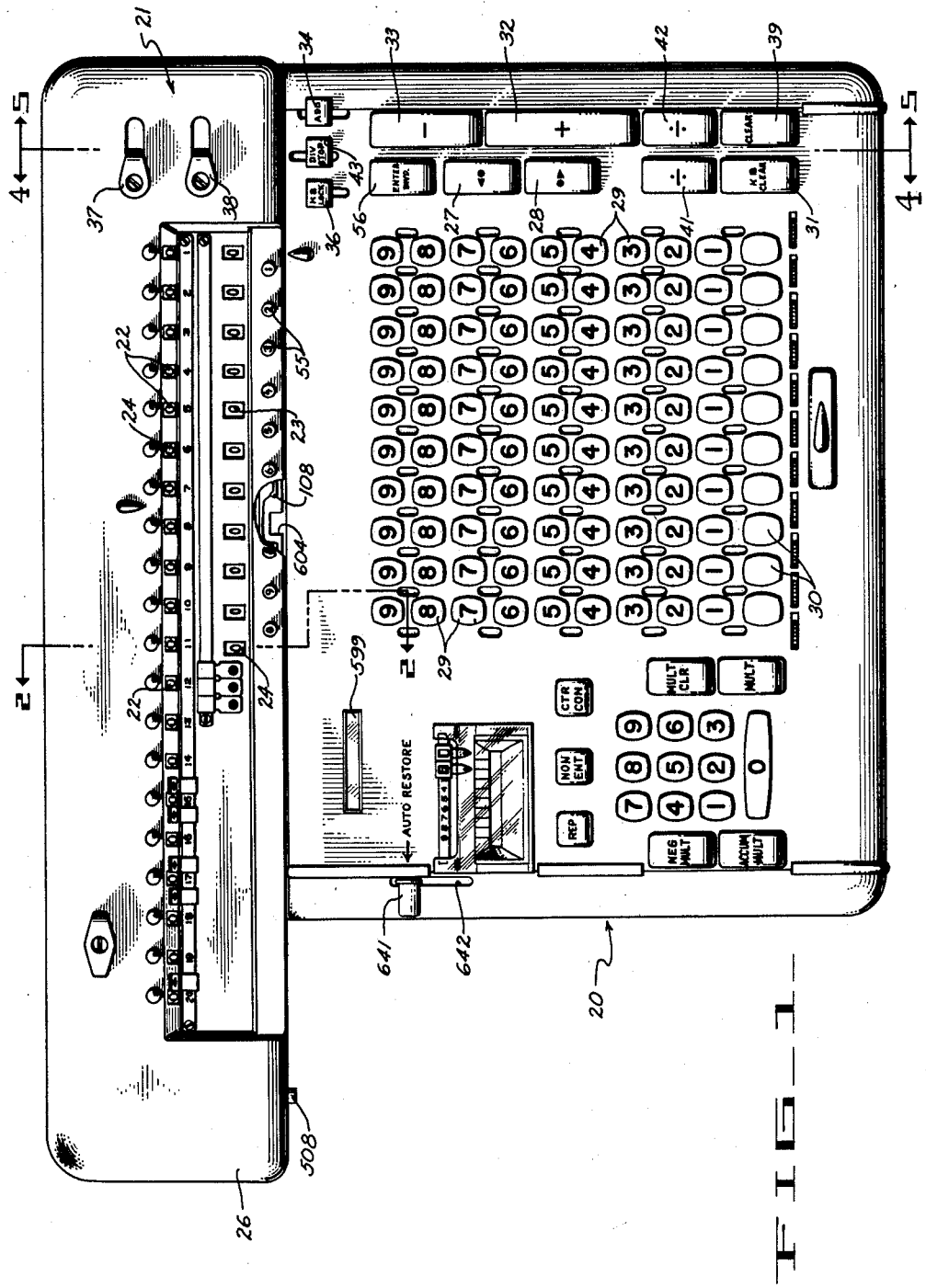
FIG_1

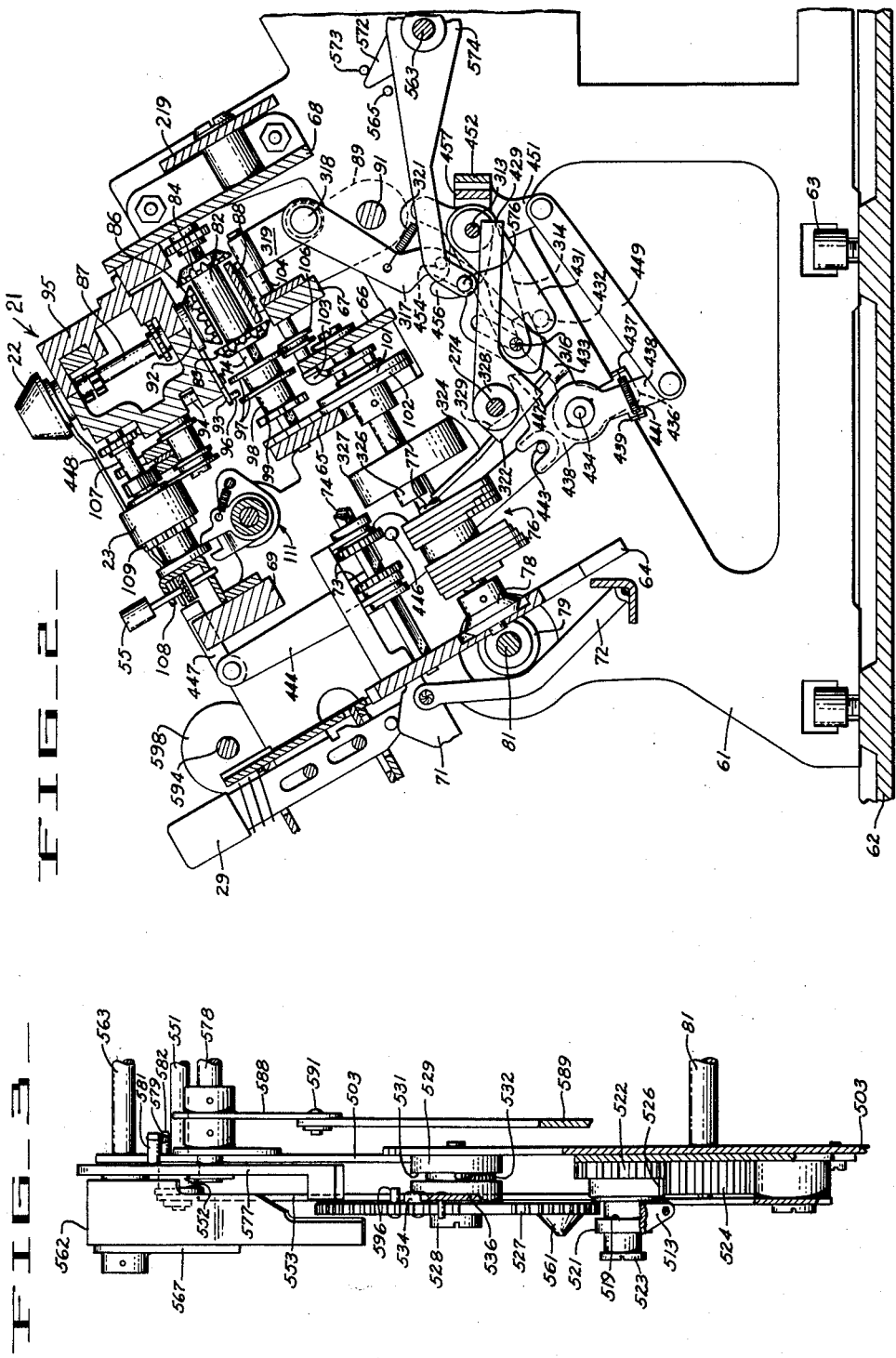

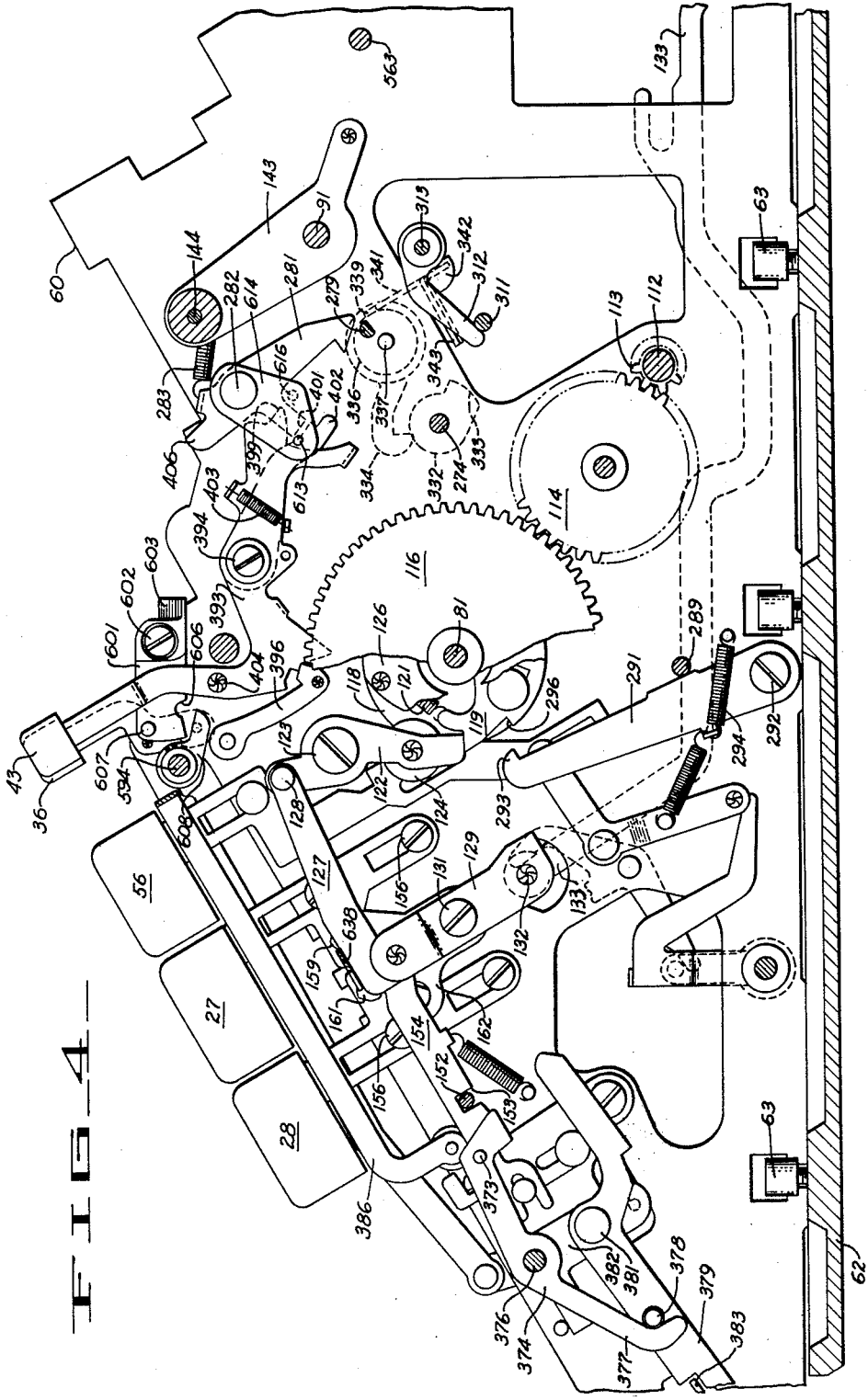

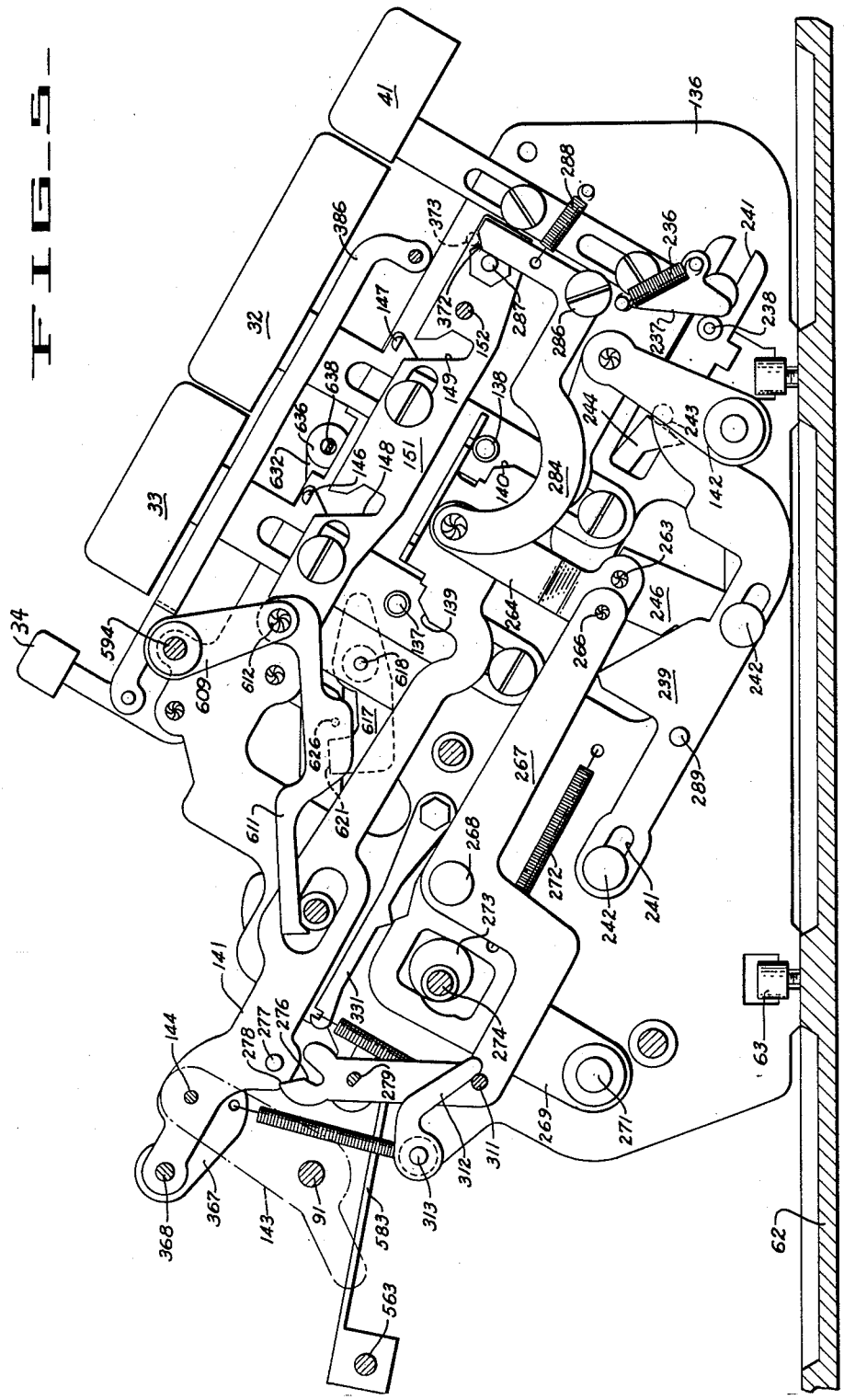

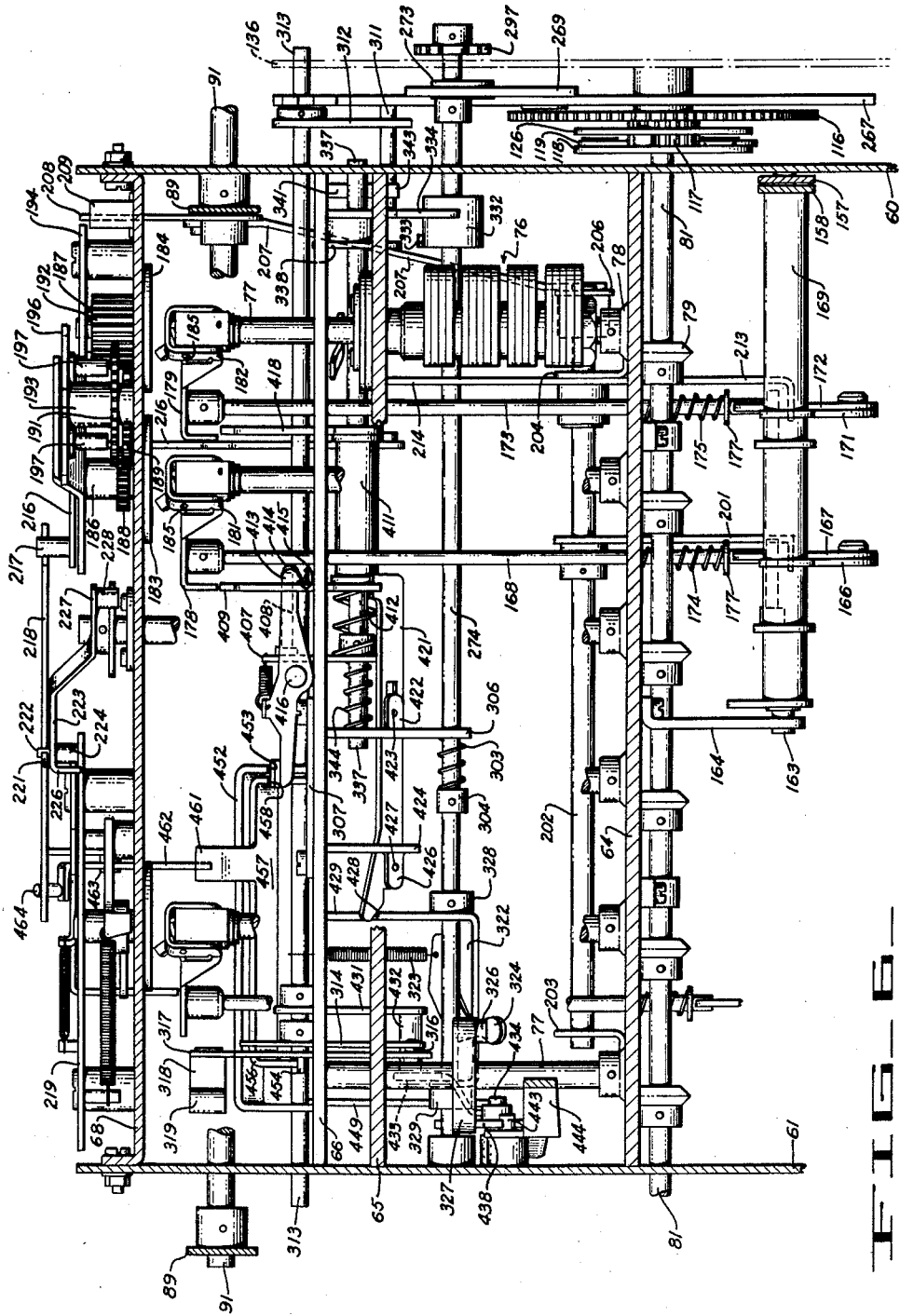

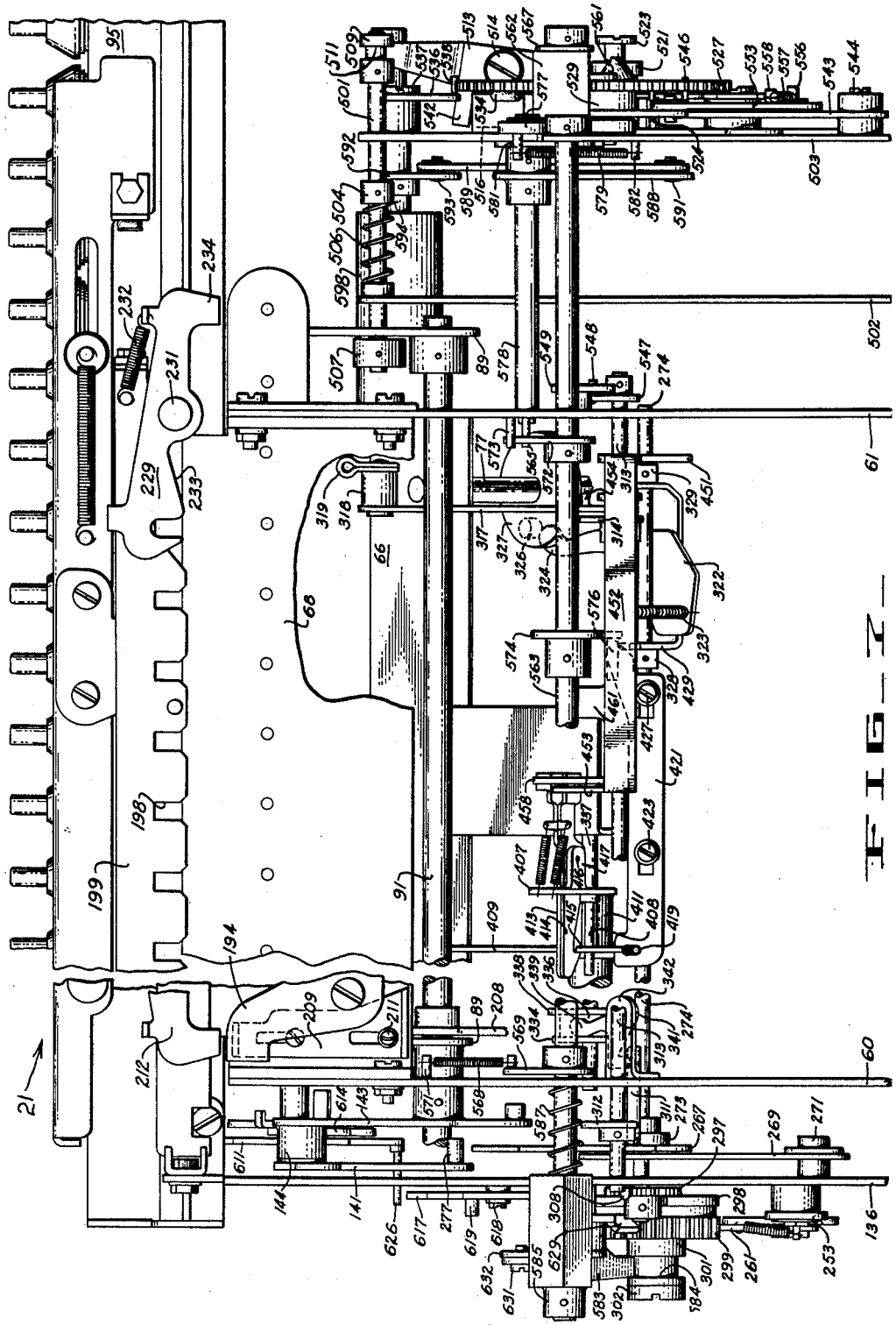

Feb. 26, 1963  G. C. ELLERBECK  3,079,076
CALCULATING MACHINE
Filed April 11, 1960  10 Sheets-Sheet 7

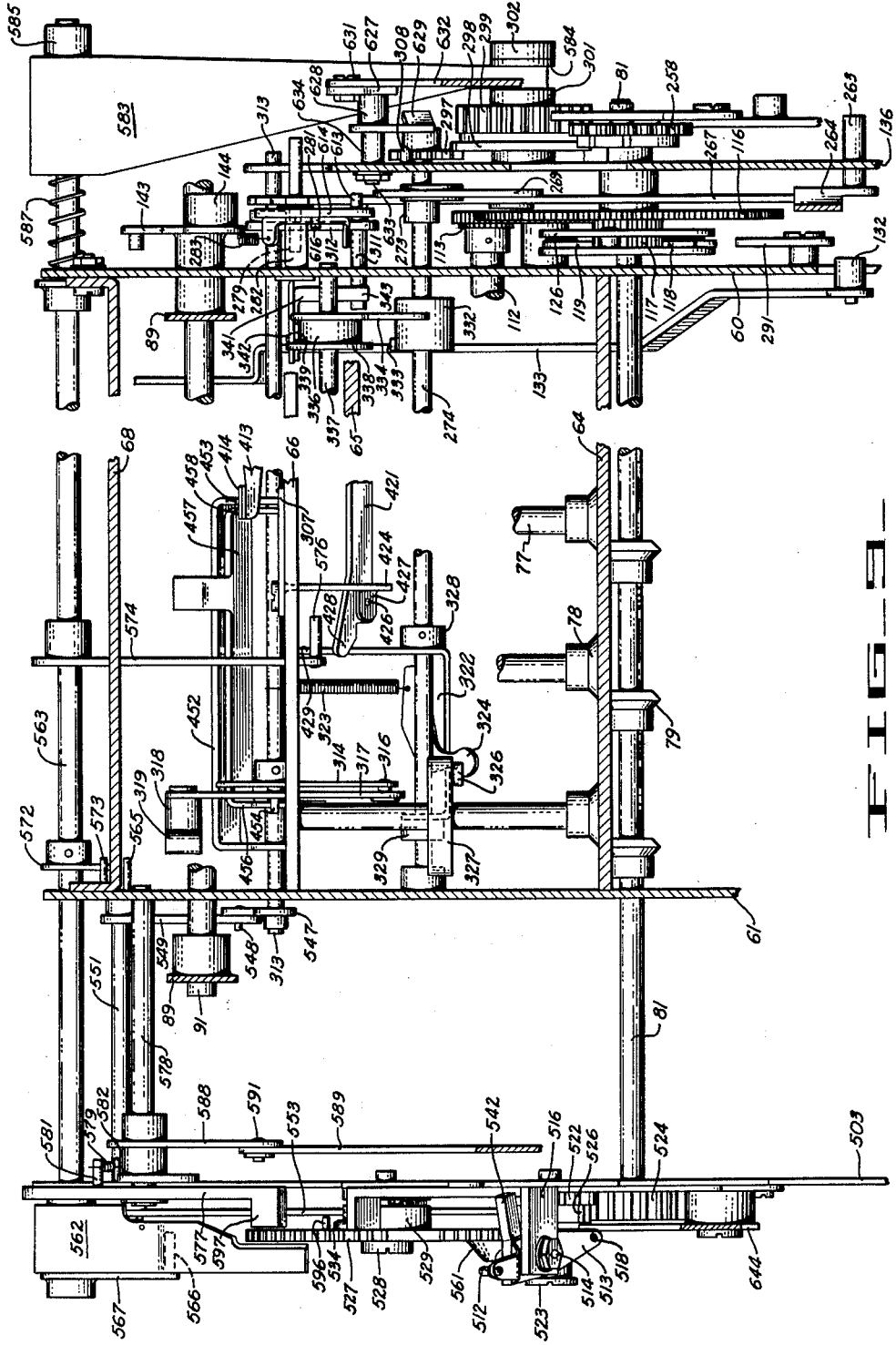

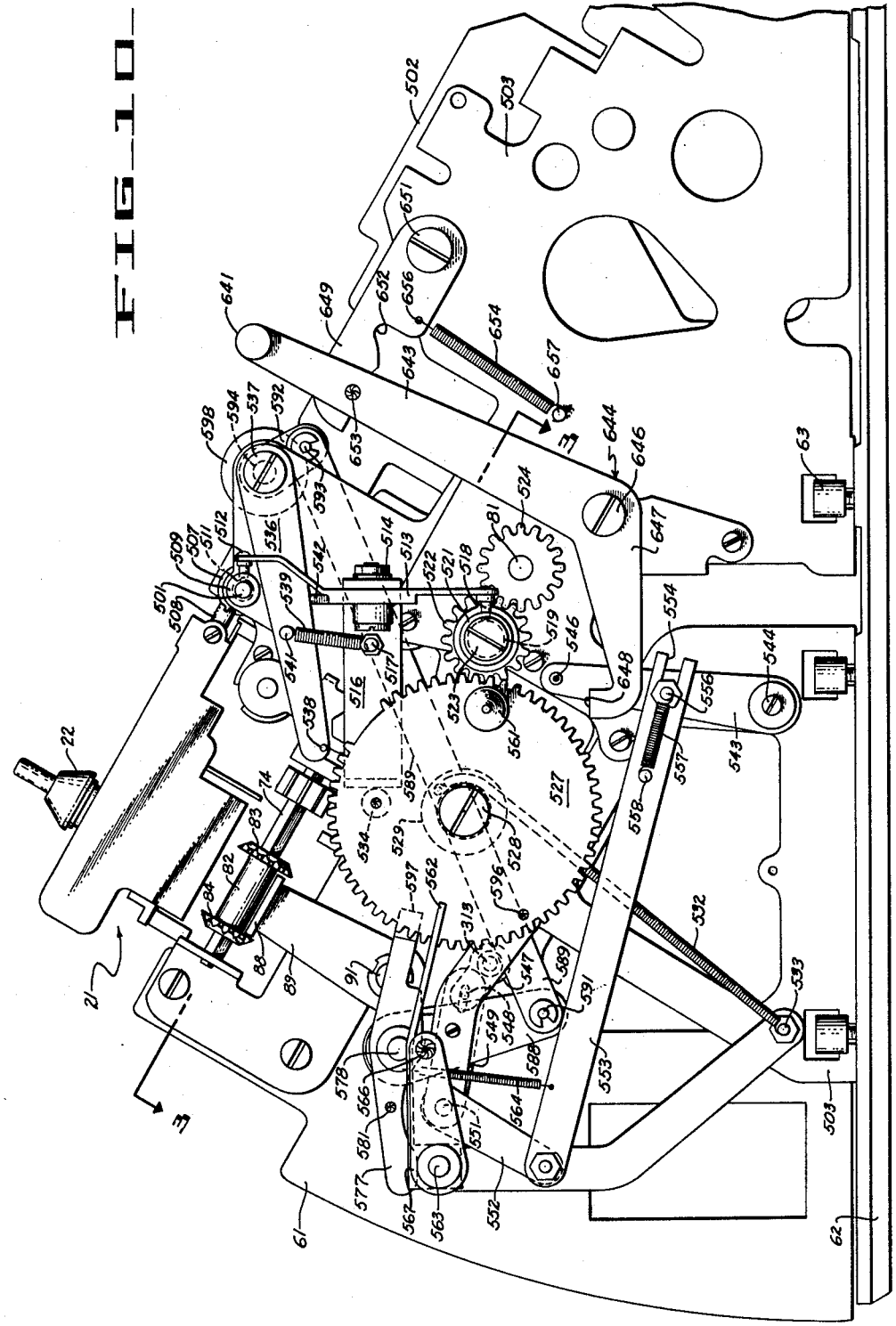

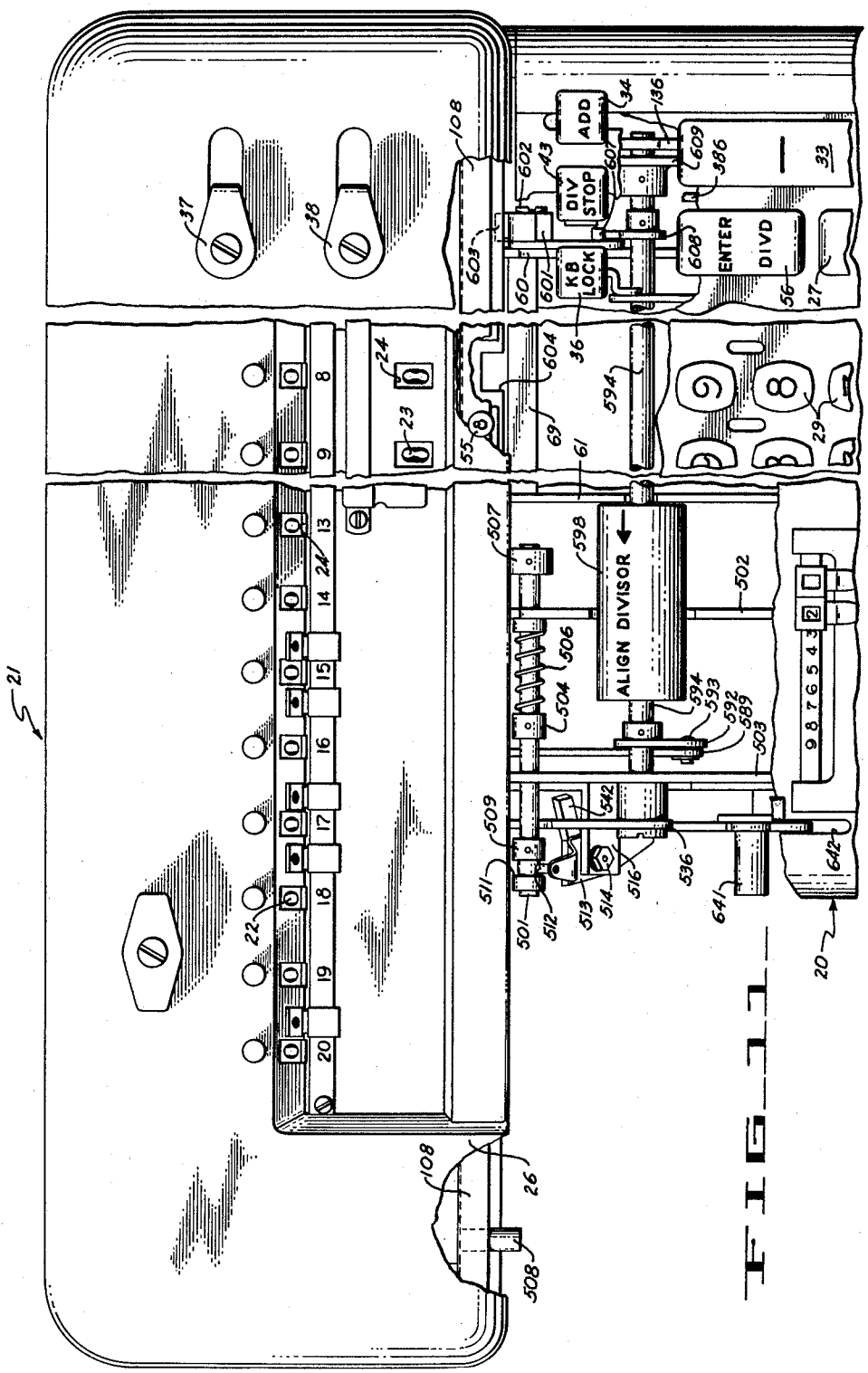

United States Patent Office 3,079,076
Patented Feb. 26, 1963

3,079,076
CALCULATING MACHINE
Grant C. Ellerbeck, San Leandro, Calif., assignor to Friden, Inc., a corporation of California
Filed Apr. 11, 1960, Ser. No. 21,231
23 Claims. (Cl. 235—63)

CONTENTS

| | Column |
|---|---|
| I. General Description | 3 |
| (a) Selection and Actuating Mechanism | 4 |
| (b) Accumulator Tens-Transfer Mechanism | 5 |
| (c) Revolutions Counter | 6 |
| (d) Drive and Clutch Mechanism | 6 |
| (e) Add and Subtract Bars | 7 |
| (f) Carriage Shift Mechanism | 7 |
| (g) Automatic Division Mechanism | 10 |
| (h) Counter Control in Division | 15 |
| (i) Add Key Disabling Means | 17 |
| (j) Division Stop Mechanism | 18 |
| (k) Division Aligner Mechanism | 19 |
| II. Dividend Restore Mechanism | 24 |
| (a) Cycle Counting Mechanism | 26 |
| (b) Simulated Overdraft | 29 |
| (c) Inactivation of Division Programming Drive Gear | 31 |
| (d) Stop Mechanism | 32 |
| (e) Additional Cycle Mechanism | 34 |
| (f) Operator's Information Sign Mechanism | 35 |
| (g) Selective Operation Control Lever | 37 |
| III. Operation | 38 |

This invention relates to an improved automatic division mechanism for calculating machines, and more particularly to a device for restoring a dividend to its original value when the dividend has been so placed in the machine that, in conventional machines, it is not properly aligned with the divisor; or, in machines equipped with a dividend-divisor aligning mechanism, it cannot be aligned with the divisor by the conventional aligner mechanism.

All of the calculating machines on the market today employ an automatic division mechanism, and the more modern are provided with an automatic dividend-divisor aligning mechanism. This mechanism controls the function of the machine in division in such a manner as to cause the dividend to the shifted automatically into alignment with the divisor, or to a right terminal position, or to any one of a selected number of predetermined intermediate positions, prior to the commencement of the actual division operation. Most of the calculating machines have a larger number of orders in the dividend register than there are in the divisor registering mechanism (the selection mechanism), so that it becomes possible to have a dividend so placed in the dividend register that the highest digit thereof extends to the left of the highest digit of the divisor, even through the dividend register has been shifted to its right terminal position. In this situation, upon commencement of the actual division operation, it would take an indefinite number of machine cycles before the true quotient could be obtained.

The present invention relates to a mechanism for restoring the dividend register to its original value after the commencement of the division operation if it takes more than eleven machine cycles to obtain an overdraft, which is the situation that arises if the highest digit of the dividend is not aligned with the highest digit of the divisor. Thus, the operator of a conventional machine is relieved of the necessity of stopping to determine whether the dividend and divisor are in correct alignment; or the operator of a machine provided with an aligner mechanism is protected against losing the dividend if the two factors cannot be aligned. In accordance with this invention, the factors are set into the machine in the customary manner, after which the division key is depressed. The novel mechanism hereinafter to be described is thereby set into operation so as to cause the dividend to be restored, if the dividend and divisor are not, or cannot, be aligned (as the case may be) after which the machine is brought to rest and the operator is informed that he should align the dividend and the divisor, or re-enter the divisor in the selection mechanism, before the machine can proceed with the conventional division operation.

Accordingly, it is an object of the present invention to provide means for increasing the ease and rapidity with which division operations may be performed. This is accomplished by providing a mechanism for automatically restoring the dividend when the repeated subtraction of the divisor from the dividend, for ten or more times, has failed to produce an overdraft, which indicates that in the machine in question, the dividend and divisor are not properly aligned.

Another object of the present invention is to provide means for operating the conventional division programming mechanism (with the register carriage in the extreme right-hand position in those machines which are equipped with an automatic dividend-divisor aligning mechanism, or in any carriage position in those machines which are not so equipped), for not more than eleven subtractive machine cycles—a condition that will result when the dividend is placed too far to the left of the divisor (or the divisor is too far to the right of the dividend) for them to be aligned, and, after the eleventh machine cycle, adjust the machine for eleven additive machine cycles, and after the eleventh additive cycle, bring the machine to rest.

A further object of the invention is to provide means to operate the division programming mechanism to restore a misaligned dividend value and notify the operator that the dividend and divisor are not in alignment.

Still another object of the invention is to provide a calculating machine having a means for operating in division, with the dividend carriage in the extreme right-hand position, for eleven machine cycles; then for creating a simulated overdraft; and then restoring the keyboard value eleven times to return the dividend to its original condition.

An additional object of this invention is to provide a restore means operating in division if it takes more than ten division cycles to create the true overdraft, which condition will result when the divisor is misaligned with the dividend, then automatically restoring the amounts subtracted from the dividend to return the dividend to its original condition, and then stop the machine.

The invention, both as to its construction and method of operation, together with further objects and advantages thereof, will best be understood by reference to the following description of a preferred embodiment of the invention as shown in the accompanying drawings in which:

FIG. 1 is a plan view of a preferred type of calculating machine incorporating automatic dividend restore mechanism exemplifying the invention;

FIG. 2 is a fragmentary cross-sectional elevation, illustrating the accumulator (dividend) register, the selection and actuating mechanisms, and some of the controls of the dividend-divisor aligner mechanism, the view being taken generally along the planes indicated by the lines 2—2 in FIG. 1;

FIG. 3 is a fragmentary horizontal section of the dividend restore actuating mechanism, the view being taken as generally indicated by the line 3—3 in FIG. 10;

FIG. 4 is an elevational view illustrating the mechanisms mounted on the right-hand side of the right side frame, the view being taken along the plane generally indicated by the line 4—4 in FIG. 1;

FIG. 5 is an elevational view illustrating the conventional division mechanism mounted on the left-hand side of the control plate, the view being taken along the plane substantially as indicated by the line 5—5 in FIG. 1;

FIG. 6 is a sectional plan view of the rear portion of the calculating machine showing the conventional carriage shift and division aligner mechanism;

FIG. 7 is a rear elevational view of the dividend restoring mechanism and of the dividend aligner mechanism, the view being broken to show both extremes of these mechanisms;

FIG. 9 is a sectional plan view of the rear portion of the machine (similar to FIG. 6), the view being broken to show both extremes of the novel dividend restore mechanism;

FIG. 10 is a side elevational view of the dividend restore apparatus mounted on the left-hand side of the auxiliary left side frame; and FIG. 11 shows an enlarged plan view of the rear portion of the calculating machine with parts of the machine covers broken away to more clearly show certain mechanisms of the dividend restore mechanism.

I. GENERAL DESCRIPTION

Figure 8:
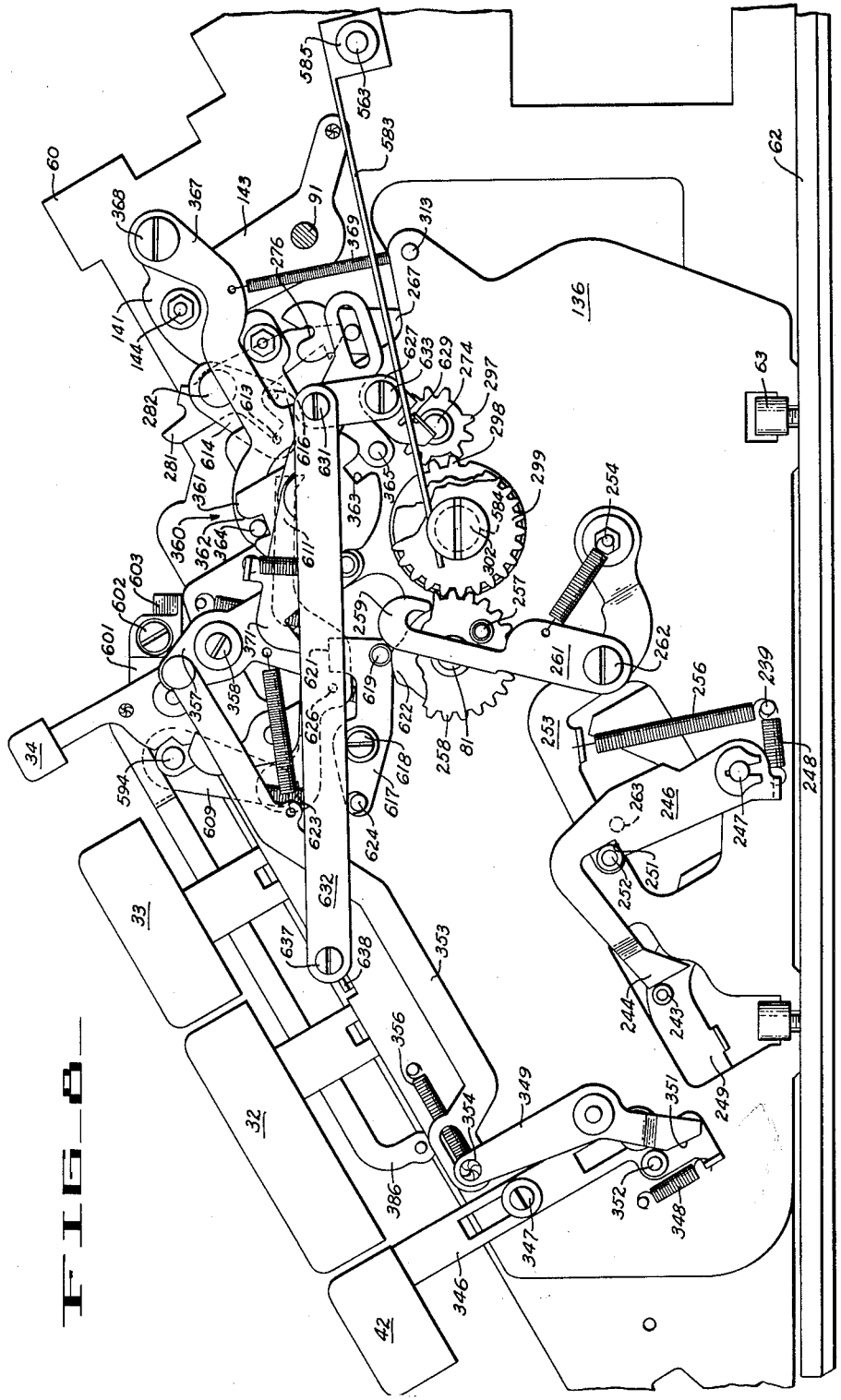
FIG. 8 is a side elevational view showing the mechanism mounted on the right-hand side of the control plate, i.e., the mechanism on the opposite side of the control plate shown in FIG. 5.

The present invention is an improvement on calculating machines of the type disclosed in Patent No. 2,327,981, issued to Carl M. F. Friden on August 31, 1943, which relates to an improved automatic division mechanism, and in Patent No. 2,653,765, issued to Anthony B. Machado et al., on September 29, 1953, which relates to an automatic division aligner mechanism for the calculating machine shown and described in Patent No. 2,229,889, issued to Carl M. F. Friden on January 28, 1941.

Referring to FIG. 1, the calculating machine incorporating the present invention includes the main body portion 20, containing the actuating, selection and control mechanisms of the machine. Furthermore, there is provided the accumulator and revolutions counter carriage 21 which is mounted for endwise shifting movement transversely of the body portion 20. The carriage 21 has mounted therein a series of accumulator (dividend) dials 22 and also a group of revolutions counter (quotient) dials 23 which are viewable through suitable windows 24 provided in the carriage cover 26. The carriage 21 may be shifted by power in either direction transversely of the body portion 20 by manipulation of a left shift key 27 and a right shift key 28, which keys are located on the right-hand side of the machine.

Numerical values may be entered in the machine by depression of the appropriate numeral keys 29 of the conventional keyboard. The keys 29 in each ordinal row are manually depressible, and are latched in a depressed position, to control the entry of values into the accumulator dials 22. A depressed key is releasable individually by depression of the coordinal clear, or "0," key 30 situated at the forward end of each order of value keys, or all of the depressed keys may be simultaneously released by depression of a keyboard clear key 31 located on the right-hand side of the machine.

The various values set in the keyboard may be registered additively or subtractively in the accumulator dials, or wheels, 22 by the depression of a plus bar 32 or the minus bar 33, respectively. If it is desired that the keyboard be automatically cleared after each registration of a number in the accumulator, the add key 34 may be moved forwardly in the well-known manner. If it is desired to lock the keyboard against manual or automatic clearing, the conventional keyboard lock key 36 can be moved forward to accommodate this situation in the well-known manner.

The accumulator dials 22 and the counter dials 23 may be cleared, or reset to "0," by manipulation of manually operable reset knobs 37 and 38, respectively, these knobs being mounted for lateral sliding movement in the framework of the carriage. Alternatively, the dials 22 and 23 may be zeroized by power through the depression of the clear key 39. The machine is adapted to perform automatic division operations by manipulation of the pair of division control keys 41 and 42 which control the division mechanism similar to those described in the Friden Patent No. 2,327,981 and the Machado Patent No. 2,653,765, mentioned above. In order to stop the division operation, once this operation has been initiated, there is provided the conventional division stop key 43, the rearward movement of which will bring the machine to a stop at the end of the cycle during which the key was operated, or the forward movement of which will terminate the division operation with a true quotient figure at the end of the current ordinal series of operations.

The machine is also provided with a group of ordinally arranged tabulator keys, or buttons, 55, and a dividend entry key 56 for effecting entry of a dividend set in the value, or amount, keys 29 into the accumulator dials, or wheels, 22 in any selected ordinal position of the register carriage 21. This mechanism is fully shown and described in detail in Patent No. 2,403,273, issued to Carl M. F. Friden et al. on July 2, 1946, and reference is made to this patent for a complete description of the dividend entry mechanism.

(a) Selection and Actuating Mechanism

The various operating mechanisms of the calculating machine are, generally speaking, supported on, or between, the right side frame 60 (FIGS. 4, 6, 7 and 9) and the left side frame 61 (FIGS. 2, 6, 7, 9 and 10), which frames are secured to the machine base 62 by suitable fasteners, such as nuts and bolts 63. The machine base 62 also serves to support the electric driving motor (not shown) which provides the only source of power for the various mechanisms of the machine, hereinafter described. The right and left side frames 61 and 62, respectively, are secured together in spaced relationship by various cross-members, including the front bearing plate 64 (FIGS. 2, 6 and 9), center bearing plate 65, auxiliary bearing plate 66, guide bar 67, rear bearing plate 68, and the carriage support bar 69, which are all shown in cross-section in FIG. 2.

The value to be entered into the accumulator numeral dials 22 is determined by means of pairs of similar selection bars, or slides, associated with the value keys. As shown in FIG. 2, each order of value keys 29 cooperates with a pair of selection bars 71 in the well-known manner. These selection bars 71 are mounted for longitudinal movement by pairs of similar rockable arms 72 (only one shown in FIG. 2) and extend through suitable slots provided therefor in the front bearing plate 64.

Each selection bar 71 is, conventionally, provided at its rear end with a yoke which engages a ten-tooth selection gear 73 which is slidably and nonrotatably mounted on the longitudinally extending square shafts 74 suitably journalled in the front, center and rear bearing plates 64, 65 and 66, respectively. Hence, the longitudinal movement of any selection bar 71, as differentially controlled by the numeral keys 29, serves to position the selection gears 73 into the path of a series of teeth provided on similar stepped-tooth actuators 76 secured to the series of actuator shafts 77 suitably journalled between the front bearing plate 64 and the auxiliary bearing plate 66. For each adjacent pair of key orders, there is conventionally provided one longitudinally extending actuator shaft 77 having two actuators 76 secured thereto (as shown in FIG. 6). Each actuator shaft 77 is provided at its forward end with a bevel gear 78 which meshes with a corresponding bevel gear 79 secured to a power shaft 81 journalled between the two frame plates 60 and 61. The main power shaft 81 is cyclically operated by means of a unidirectional, clutch-controlled driving means, hereinafter to be described, so as to provide a single path of power from the electric motor (not shown) to the various power-operated mechanisms of the machine.

Each of the square shafts 74 is provided at its rear end with a slidably but nonrotatably mounted spool 82 (FIG. 2). Secured to the forward extremity of each spool 82 is the ten-tooth add gear 83 and secured to the rearward extremity of each spool is the ten-tooth subtract gear 84, both of which gears are adapted to cooperate with a ten-tooth accumulator gear 86 secured on the lower end of an accumulator dial shaft 87. When the machine is in its full-cycle, or home, position, the accumulator gears 86 lie midway between the add and subtract gears 83 and 84, so as to permit lateral shifting of the carriage 21, as will be hereinafter explained under the section entitled "Carriage Shift Mechanism."

In order to enable the values set into the value keys 29 to be entered into the accumulator dials 22, the spools 82 and their add-subtract gears 83, 84 are shiftable in either of two different directions, i.e., toward the rear of the machine so as to engage the add gears 83 with the accumulator gears 86, or toward the front of the machine so as to engage the subtract gears 84 with the gears 86. This shifting of the add-subtract gears is accomplished by means of the flat bar, or plus-minus gate strap, 88 extending transversely of the machine and lying within the space provided between the add-subtract gears 83 and 84. Gate 88 is supported at either end thereof by similar arms 89 (FIGS. 2, 6, 7, 9 and 10) secured to a transverse gate shaft 91 journalled between the side frames 60 and 61. The gate shaft 91 may be rocked rearwardly (clockwise in FIG. 2) in such a manner (hereinafter described under the heading "Add and Subtract Bars") as to cause engagement of the add gears 83 with the accumulator gears 86, or, alternatively, the shaft 91 may be rocked forwardly (counter-clockwise in FIG. 2) so as to result in the engagement of the subtract gears 84 with the accumulator gears 86.

*(b) Accumulator Tens-Transfer Mechanism*

Secured to the lower end of each dial shaft 87, immediately above the accumulator gear 86, is a tens-transfer cam 92, which is adapted to cooperate with a tens-transfer lever 93. Each of these levers 93 has secured thereto a stud 94 which is journalled in the lower forward portion of a frame bar 95 of the shiftable carriage 21. One arm of each tens-transfer lever 93 is provided at its end with a formed-over ear, or stud, 96, which lies between the pair of flanges 97 formed on the hub 98 of a tens-transfer gear 99 mounted on the square shaft 74 of the next higher order of the machine. Each tens-transfer gear 99 and its hub 98 is slidably, but nonrotatably, mounted on its square shaft 74, whereby rotation of these gears 99 will be transmitted through the add-subtract spool 82 to the coordinal dial shaft 87. Whenever an accumulator dial 22 passes from "0" to "9" or from "9" to "0," the nose on the tens-transfer cam 92 will rock the associated tens-transfer lever 93, which will result in shifting the hub 98 and tens-transfer gear 99 in the adjacent higher order into the path of the single-tooth tens-transfer actuator 101. A single-tooth tens-transfer actuator 101 is provided for each tens-transfer gear 99, and a pair of actuators is mounted by suitable studs to the Geneva block 102 secured in the conventional manner to the associated actuator shaft 77. The single-tooth tens-transfer actuator 101 will thereby cause one step of movement to be given, additively or subtractively, to the higher order square shaft 74 in addition to the normal movement imparted thereto by the stepped-tooth actuator 76. The accumulator dial 22 will thus be advanced one step so as to effect the tens-transfer from one order to the next higher order as required.

After the tens-transfer has been effected, the tens-transfer gears 99 will be restored to their normal, inactive position by means of a restoring cam 103 associated with each actuator tooth 101. Each of these restoring cams 103 engages the forward end of a detent pin 104 which is mounted for sliding movement in the auxiliary plate 66 and in the guide bar 67. Each detent pin 104 carries a pair of spaced flanges 106 which embraces the rearward flange 97 provided on the coordinal tens-transfer gear hub 98, so that when the pins are cammed rearwardly, the tens-transfer gears 99 will be restored to their normal, inactive position.

*(c) Revolutions Counter*

As shown in FIG. 2, the revolutions counter, or quotient, dials 23 are secured to ordinally arranged and longitudinally extending shafts 107. These shafts 107 are journalled at their rear ends in the frame bar 95 of the carriage 21, and the forward ends are journalled in a front carriage rail 108, which rail forms a part of the framework of the carriage and is supported for sliding movement on the rear side of the carriage support bar 69. Secured to each of the dial shafts 107 is a counter gear 109 which is arranged to cooperate with the revolutions counter actuating mechanism, generally indicated at 111 in FIG. 2. This counter mechanism 111 operates the counter dials 23 in such a manner as to provide a count of the cyclic operations of the calculating machine and also for causing a unit to be transferred from a lower order to a higher order each time the operative dial 23 passes through "0."

The revolutions counter mechanism is fully shown and described in the above-mentioned Patent No. 2,229,889, to which reference may be had for a more complete disclosure of this part of the machine.

*(d) Drive and Clutch Mechanism*

In order to effect registration in the accumulator dials 22 of the value set in the value keys 29, the actuator shafts 77 are cyclically operated by means of a clutch-controlled drive from the electric motor (not shown) of the machine. Referring now to FIG. 4, the motor shaft 112 has secured thereto a pinion gear 113 which is in mesh with an idler gear 114, which, in turn, meshes with a large driven gear 116 rotatably journalled on the main power shaft 81. The large gear 116 has secured to the hub thereof a driving ratchet gear 117, as shown in FIGS. 6 and 9. The driven clutch element, or plate, 118 is secured to the power shaft 81 adjacent the right side frame 60. This clutch plate 118 has pivotally mounted thereon a spring-urged clutch pawl 119 provided with a tooth which is adapted to engage with the face of the teeth of ratchet 117 for establishing a driving connection between the large gear 116 and the main power shaft 81. The pawl 119 is spring-urged into driving engagement with ratchet 117 by spring 121 connected between pawl 119 and a stud on the clutch plate 118. However, normally, the pawl 119 is restrained in an open, or full-cycle, position by means of a clutch control lever 122 pivotally mounted on a screw 123 secured to the right side frame 60. The control lever 122 carries a roller 124 at its lower end, which roller (in the full-cycle position of clutch plate 118 and shaft 81) sits in a depression formed in a clutch plate cam 126 secured to the clutch plate 118 adjacent the large gear 116. The roller 124, when registering with the depression of this cam 126, enables the control lever 122 to engage the clutch pawl 119 and force it out of disengagement with ratchet 117, and in all other positions of the cam, maintains the control lever 122 in its clutch-engaging position. It can be seen, therefore, that one or more cycles of the actuator shafts 77 may be determined by proper control of the lever 122.

Simultaneously with the movement of the clutch control lever 122 to cause engagement of the clutch, in a clockwise direction in FIG. 4, the electric circuit for the driving motor will be established. For this purpose a link 127 is connected to the upper end of control lever 122 by stud 128. The other end of the link 127 is connected to the upper end of a lever 129 pivotally mounted on a screw 131 secured to the right side frame 60. Secured to the lower end of lever 129 is a pin 132 which extends transversely through an aperture in the right side frame 60. One end of a long rearwardly extending link 133 is connected to the pin 132, while the other end controls the operation of the normally open micro-switch (not shown) provided in the electric motor circuit. Thus, movement of the clutch control lever 122 (clockwise in FIG. 4) will cause forward movement of the link 133, thereby closing the motor switch and establishing the electric circuit for the motor. It will be observed that the roller 124, in maintaining the control lever 122 in its clutch-engaging position throughout the machine cycle, will also serve to maintain the micro-switch closed, so that the motor circuit can be interrupted only in the full-cycle position of the parts.

(e) *Add and Subtract Bars*

Referring to FIG. 5 of the drawings, it will be seen that the key stems of the plus bar 32 and the subtract bar 33 are both slidably mounted, in a conventional manner, on the control frame, or plate, 136 mounted on the machine base 62 by suitable fasteners, such as the nuts and screws 63. The key stems of the subtract bar 33 and the plus bar 32 are provided with rollers 137 and 138, respectively, which cooperate with oppositely inclined cam faces 139 and 140, respectively, provided on the add-subtract control slide 141. This slide 141 is pivotally connected at either end thereof to the upper ends of two upstanding arms 142 and 143, the arm 142 being pivoted on the control plate 136, while the other arm 143 is rigidly secured to the right end of the gate shaft 91. The rearward arm 143, as best shown in FIG. 4, is connected to the slide 141 by means of the stud and spacer 144. Hence when the plus bar 32 is depressed, the control slide 141 will be moved rearwardly, so as to rock the gate shaft 91 rearwardly (clockwise in FIG. 2 and counter-clockwise in FIG. 5), thereby causing the add gears 83 to be engaged with the accumulator gears 86, as described above under the section entitled "Selection and Actuating Mechanism." In a similar manner, depression of the subtract bar 33 will cause forward movement of the control slide 141, thereby rocking the gate shaft 91 forwardly (counter-clockwise in FIG. 2 and clockwise in FIG. 5), so as to engage the subtract gears 84 with the accumulator gears 86, as described above.

In order to initiate operation of the machine when either the subtraction bar 33 or addition bar 34 is depressed, the key stems thereof are provided with the half-round studs 146 and 147, respectively, which are adapted to cooperate with the inclined cam faces 148 and 149, respectively, provided on the clutch and motor control slide 151 (FIG. 5). The forward end of the control slide 151 carries a stud 152 which rides in a notch 153 provided in the spring-biased add-subtract control link 154 (FIG. 4) connected to the upper end of the lever 129. When either bar 33 or 34 is depressed, the stud 152 will be moved rearwardly, thereby rocking the clutch control lever 122 in such a manner as to engage the clutch and close the motor switch. This will cause the electric motor of the machine to be energized and the power shaft 81 to be rotated, thereby driving the actuator shafts 77 to which are secured the stepped actuators 76. Hence the numerals set in the value keys 29 will be transferred into the accumulator dials 22 in either an additive or a subtractive direction, depending upon which of the control keys 33 or 34 is depressed.

(f) *Carriage Shift Mechanism*

Means is provided for shifting the carriage 21 selectively in either direction through one or more ordinal spaces. The shifting means is preferably operated from the two actuator shafts 77 on the right side of the machine, and is under the control of the manually depressible left and right shift keys 27 and 28, respectively. As seen in FIG. 4, these keys 27 and 28 are conventionally mounted for vertical sliding movement on the right side frame 60 by suitable pin-and-slot connections 156 and are normally maintained in their raised position by means of conventional springs (not shown).

As fully shown and described in Patent No. 2,636,678, issued to Morton P. Matthew on April 28, 1953, the shift keys carry a roller stud (not shown) which cooperates with one of the two arms 157 and 158 (FIG. 6) and causes one of the arms to be rocked whenever the respective key is depressed. As will later be described in this section, rocking of these arms will cause operation of the left shift drive or the right shift drive, respectively, and thereby determine shifting of the carriage in one direction or the other. As disclosed in Matthew Patent No. 2,636,678 above, the shift keys 27 and 28 carry respective pins 159 and 161 (FIG. 4) which cooperate with inclined cam slots (not shown herein) provided in a bifurcated arm 162. The bifurcated arm 162 is suitably connected to the lever 129, so that this lever is rocked upon depression of either of the shift keys 27 or 28, and thereby initiates cyclic operation of the drive shaft 81 and consequently all of the actuator shafts 77 so as to provide the power drive for the shift mechanism.

Referring again to FIG. 6, it is conventional for the arm 157 to be secured to a transverse shaft 163 journalled between the right side frame 60 and a bracket 164 secured to the front bearing plate 64. Also secured to the shaft 163 is a depending arm 166 to which is pivotally connected a left shift pusher link 167. This pusher link 167 is notched at its rear end so as to engage the forward end of a left shift push rod 168 which is mounted for longitudinal movement in the front plate 64 and the auxiliary bearing plate 66. The pusher link 167 is biased downwardly, so that the notch provided in the rear end thereof is normally maintained in contact with the forward end of the push rod 168, by means of a suitable spring (not shown).

The arm 158 is secured to the right-hand end of a sleeve 169 which is rockably mounted on the transverse shaft 163. To the left-hand end of this sleeve 169 is secured a depending arm 171 similar to the previously mentioned arm 166. Pivotally connected to arm 171 is a right shift pusher link 172 which, like the pusher link 167, is notched at its rearward end so as to engage with the forward end of the right shift push rod 173, which also is mounted for longitudinal movement in the bearing plates 64 and 66 similar to the push rod 168. The notch in the pusher link 172 is normally biased into engagement with the forward end of the right shift push rod 173 by means of a suitable spring (not shown) resiliently forcing the arm 172 downwardly. The push rods 168 and 173 are normally maintained in their forward, or inactive, positions shown in FIG. 6 by means of compression springs 174 and 175, respectively, which are compressed between the forward wall of the front bearing plate 64 and washers 177 provided near the forward ends of the respective push rods.

Pinned to the rear end of the left and right push rods 168 and 173 are the left and right shift controllers 178, 179, respectively, which are adapted to rock respective left and right clutch-engaging arms 181 and 182 into engagement with their clutch-driven members 183 and 184. In order to shift the carriage 21 in either direction selectively, the two rightmost actuator shafts 77 are extended rearwardly and have the respective left and right clutch-engaging arms 181, 182 pivotally connected to the ends thereof by pins 185 in such a manner as to form a readily controllable clutching and declutching engagement with the associated clutch-driven members 183 and 184. The clutch-driven members 183 and 184 are formed on the forward ends of gear sleeves 186 and 187, respectively, suitably journalled in the rear bearing plate 68 and a bearing bracket 194 attached thereto by suitable spacers and screws, as shown in FIG. 6. When either the left clutch-engaging arm 181 or the right clutch-engaging arm 182 is rocked rearwardly by its associated shift controller 178 or 179, it will be seen that the engaging arms 181, 182 provide a means for selectively connecting the respective gear sleeves 186 or 187 with the driving motor of the machine through the main clutch, the respective actuator shaft 77, the corresponding clutch-engaging arm 181 or 182, and the clutch-driven member 183 or 184. Hence upon depression of the left shift key 27, the arm 157 will be rocked and the pusher link 167 moved rearwardly so as to move the push rod 168 and the shift controller 178 toward the rear of the machine, thereby causing the engaging arm 181 to establish a driving connection from the actuator shaft 77 to the gear sleeve 186. In a similar manner, when the right shift key 28 is depressed, the arm 158 will be rocked and the pusher link 172 moved rearwardly so as to move the push rod 173 and shift controller 179 toward the rear of the machine, thereby establishing a driving connection between the rightmost actuator shaft 77 and the gear sleeve 187.

As seen in FIG. 6, the gear sleeve 186 carries the gear 188 which meshes with the large gear 189 of a compound gear. This large gear 189, as is conventional, carries an integral small gear (not shown) on its rear face, which small gear meshes with a shift gear 191. Similarly, the gear sleeve 187 carries a gear (not shown, but similar to the gear 188) which meshes with a wide idler gear 192, which also meshes with the large gear 189 and causes reverse rotation of this gear. The gear sizes are chosen to provide a drive ratio of 1:4 between the sleeves 186 and 187 and the shift gear 191. Thus the shift gear 191 will be rotated through an angle of 90° in each machine cycle, thereby shifting the carriage 21 one ordinal space in either direction for each cycle of operation of the machine.

The shift gear 191 is secured to a short shaft 193 which is journalled between the rear bearing plate 68 and the bearing bracket 194 mounted on the rear plate 68. Secured to the shaft 193 adjacent the bracket, or plate, 194 is a drive plate 196 which carries four equally spaced drive pins 197. The drive pins 197 are adapted to engage in ordinal notches 198 (FIG. 7) provided in a shift rack 199 secured to the rear of the carriage frame bar 95. Hence for each 90° of rotation of the drive plate 196, the carriage 21 will be shifted through a distance equal to the spacing between the notches 198 (which is equal to the distance between the numeral dials 22).

Conventional means is provided for disabling the control of the shift keys 27 and 28 whenever the carriage 21 reaches either of its extreme end positions. This conventional disabling means comprises, as shown in FIG. 6, the left shift disabling, or lift, arm 201 secured at its rear end on the transverse shaft 202. This shaft 202 is journalled at its ends in the brackets 203 and 204 which are secured to the rear face of the front bearing plate 64. Secured to the right-hand end of this shaft 202 is a downwardly extending arm 206, to the lower end of which is pivotally connected the forward end of a rearwardly extending link 207. This link 207 is pivotally connected at its rear end to the lower end of the bellcrank 208 which is rockably mounted on the gate shaft 91. As shown in FIGS. 6 and 7, this bellcrank 208 has its rearwardly extending arm lying beneath the left shift disabling slide 209, slidably mounted adjacent the right end (to the left when viewed from the rear of the machine, as in FIG. 7) of the rear bearing plate 68 by suitable pin-and-slot connections 211. The slide 209 is so constructed and arranged (as best shown in FIG. 7) that it lies beneath a left shift override pawl 212 which is pivotally mounted in a conventional manner on the rear of the shift rack 199. When the carriage reaches its left end position and a further shift is attempted, one of the shift pins 197 will rock the override pawl 212 and thereby cause the slide 209 to move downwardly against the tension of a spring (not shown) which normally maintains this slide in its inactive raised position. Such movement of slide 209 rocks bellcrank 208, causing the link 207 to move forwardly and rock the shaft 202. Thereupon the forward end of the lifter arm 201, which is rigidly secured to the shaft 202, will be raised so as to disengage the notch formed in the rear end of the pusher link 167 from the forward end of the push rod 168, thus permitting this rod to be moved forwardly to its inactive position by its compression spring 174. Hence, the left shift clutch will be disengaged and the left shift operation terminated whenever the carriage 21 reaches its leftmost end position and a further shift is attempted.

In a similar manner the pusher link 172, for the right shift control mechanism, is adapted to be disengaged from the push rod 173 by means of a two-armed lever, or lifter arm, 213 (FIG. 6) which is loosely journalled on the shaft 202. The lifter lever 213 has a rearwardly extending arm 214 which is provided with a slot in its distal end. This slot embraces a pin (not shown) riveted on the end of a forwardly extending arm of a rockable lever 216 loosely journalled on the gate shaft 91. The rear end of lever 216 is bent to the left to form a transversely extending portion which carries a roller 217. The roller 217 overlies the right end of a lever 218 pivotally mounted intermediate its length on a bearing plate 219 secured to the rear face of the rear bearing plate by means of suitable spacer sleeves and screws, as shown in FIG. 6. The lever 218 is provided with an upstanding ear 221 adjacent its fulcrum, which ear is engaged by a pin 222 secured to the lower arm of a bellcrank 223. This bellcrank 223 is pivotally mounted at 224 on the plate 219. It has formed integrally therewith, on its leftwardly extending arm, a bent-over ear 226 which abuts the top of plate 219, thus preventing the bellcrank from rocking so far as to disengage the pin 222 from the ear 221. The upstanding arm 227 of bellcrank 223 has a stud 228 secured thereto, which stud lies beneath a right shift override pawl 229 (FIG. 7) when the carriage 21 is shifted to its extreme right terminal position. Conventionally, the override pawl 229 is pivotally mounted at 231 on the shift rack 199, and is normally maintained in the position shown in FIG. 7 by a spring 232 which causes the shoulder formed on the pawl to be held against the top of the shift rack 199. When the carriage reaches its right end position and the right shift drive is operated, one of the shift pins 197 will engage with the cam face 233 formed on the pawl 229 and causes the pawl to be rocked (clockwise in FIG. 7) against the urgency of the spring 232. Upon rocking of the pawl 229, the nose 234 formed on the free end thereof will engage stud 228 secured to the arm 227 of bellcrank 223 and rock the bellcranck (counter-clockwise if viewed from the rear). Rocking of the bellcrank 223 will cause the right end of the lever 218 to rock upwardly, thereby elevating the rear end of the lever 216 and thus causing the lifter arm 213 to be raised and the pusher link 172 to be disengaged from the push rod 173. This will effectively disable the control exercised by the right shift key 28 over the right shift clutch and permit the compression spring 175 mounted on the forward end of the push rod 173 to disengage the shift clutch and thereby terminate the right shift operation.

(g) *Automatic Division Mechanism*

As mentioned earlier herein, the machine shown in the accompanying drawings is provided with a mechanism for enabling a dividend registered in the accumulator dials 22 to be automatically divided by the divisor set in the value keys 29. The mechanism provided in the present embodiment of the instant invention for accomplishing this purpose is similar to that shown in Patent No. 2,327,981 hereinbefore referred to, and accordingly, only so much of the automatic division mechanism will be described herein as is necessary for a clear understanding of the novel mechanism described hereinafter.

The automatic division mechanism operates to control the operation of the machine so as to cause the divisor to be repeatedly subtracted from the dividend until an overdraft occurs in the accumulator. Thereupon the overdraft will be corrected and the carriage shifted one ordinal space to the left, and the process will be repeated in the lower order. The number of subtraction cycles effected in each order of the accumulator is registered in the revolutions counter, so as to provide a visible representation of the quotient at the end of the problem. During a division operation, the machine is controlled by a program control means which becomes effective each time an overdraft occurs in the accumulator. This program means controls the operation of the add-subtract gears and the carriage shift mechanism so as to cause the sequence of continuous subtraction to an overdraft, then a single addition to correct the overdraft, and finally a left shift operation—all of which occur during uninterrupted cyclic operation of the actuating mechanism of the machine. The division operation is initiated by the depression of the division control key 41, which will cause the programming control means to be operatively connected with the add-subtract gate and with the carriage shift mechanism, and will render the overdraft control mechanism effective to control the cycling of the programming means.

As shown in FIG. 5, the division key 41 is slidably mounted on the control plate 136 by means of slots in the key stem which cooperate with screws secured to the control plate so as to guide the key for vertical reciprocatory movement. The key 41 is normally urged to its raised position by means of the spring 236 tensioned between a stud on the lower end of the key stem and a stud on the control plate 136. The key stem is provided at its lower end with an inclined cam face 237 which bears against a roller 238 mounted on the forward end of a division control slide 239. This slide is supported for movement on the control plate 136 by means of elongated slots 241 provided in the slide 239 which embrace studs 242 secured to the control plate. There is also provided a roller 243 (see also FIG. 8) mounted on the right side of the control slide 239 which extends through an aperture in the control plate 136. This roller lies in front of a finger 244 formed integrally with a latch arm 246 pivotally mounted at 247 on the right-hand side of the control plate 136. The latch arm 246 is urged to a latching position (counter-clockwise in FIG. 8) by means of a spring 248 tensioned between the lower end of this arm and a stud 249 mounted on the control plate. Normally this spring maintains a shoulder 251 of the latch arm 246 beneath a roller stud 252 secured to the forward end of the division actuator lever 253. The actuator, or division setting, lever 253 is pivotally mounted on the control plate by a suitable stud 254, and is urged to rock downwardly by means of a strong spring 256 tensioned between the actuator and the stud 249. The roller 252 is thereby maintained in engagement with the shoulder 251 of the latch arm 246 when the parts are in the ineffective position shown in FIG. 8. However, when the division key 41 (FIG. 5) is depressed, the cam face 237 will engage the roller 238 and thereby move the division control slide 239 rearwardly of the machine. This movement causes the roller 243 to engage the finger 244 and rock the latch arm 246 (clockwise in FIG. 8), thus removing the shoulder 251 from beneath the roller 252 of the actuator 253. The actuator 253 will thereupon rock downwardly, from the force of the strong spring 256, so as to cause setting of the division control mechanism, hereinafter to be described. The actuator 253 will be restored during cycling of the machine by means of a restore roller 257 mounted on the web of a drive gear 258 secured to the right-hand end of the main power shaft 81. The restore roller 257 is adapted to engage a hook portion 259 formed in the distal end of an upwardly extending restore link 261 pivotally mounted on the division actuator lever 253 by a pivot screw 262, so that the actuator 253 will be rocked upwardly against the tension of the spring 256 when the machine is cycled.

Lying beneath the forward end of the actuator lever 253 is a roller stud 263 (FIGS. 5 and 8) which is rotatably mounted on the lower end of a link 264. The lower end of the link 264 is pivotally connected at 266 to the forward end of a division control lever 267. This control lever 267 is pivotally mounted intermediate its length on a stud 268 carried by a division program, or cam follower, arm 269. This arm 269 is pivotally mounted on the control plate 136 by a stud 271 and urged forwardly by means of a spring 272. The division program arm 269 is provided with an aperture, within which is located a division program cam 273 mounted on the program control shaft 274. The control shaft 274 forms an essential part of the program control mechanism and is rotated during division operations to control the setting of the add-subtract gate and the operation of the carriage shift mechanism. These operations are performed in the predetermined sequence mentioned, so as to cause the machine to carry out a division operation during continuous cycling of the machine.

The division control lever 267 is provided at its rear end with a slot 276 for engaging a stud 277 secured to the control slide 141. When the division key 41 is depressed and the actuator lever 253 (FIG. 8) is thereby released, the roller 263 will be depressed and the control lever 267 will be rocked downwardly about its pivot 268 (counter-clockwise in FIG. 5), thereby causing the inclined face 278 formed on the rear side of slot 276 to engage the stud 277 and move the add-subtract slide 141 forwardly. This forward movement of the slide 141 will cause the engagement of the subtraction gears 84 (FIG. 2) with the accumulator gears 86 and thereafter cause the stud 277 to become seated in the slot 276. The control lever 267 thereby serves as a connection between the cam follower arm 269 and the add-subtract control slide 141, so that movements of the arm 269 will be communicated to this slide 141 for the purpose of controlling the add-subtract gears during division operations.

The division control lever 267 is retained in its operative position throughout the division operation by means of a half-round stud 279 (FIG. 5) mounted on the rear portion of the lever 267. This stud 279 is adapted to be engaged by a division latch lever 281 (FIG. 4) pivotally mounted on a stud 282 secured on the right side frame 60. The latch lever 281 is urged into latching engagement with the stud 279 by means of a tension spring 283 (which biases the latch clockwise in FIG. 4). Thus the latch 281 will engage beneath the stud 279 to hold the control lever 267 in its operated position until the latch is released at the end of the division operation.

In order to initiate cycling of the machine during division operation, the link 264 (FIG. 5) is pivotally connected at its upper end to the rear end of a bellcrank 284, which, in turn, is pivotally mounted on the screw 286 secured to the control plate 136. The upstanding arm of the bellcrank 284 lies in front of a stud 287 mounted on the forward portion of the clutch and motor control slide 151. When the link 264 is moved downwardly upon the release of the actuator lever 253, the bellcrank 284 will be rocked (counter-clockwise in FIG. 5) against the urgency of its spring 288, thereby causing the slide 151 to move rearwardly to engage the clutch and close the motor switch through the means previously described under the heading "Add and Subtract Bars." Conventionally, however, the clutch 118 (see FIG. 4) is not engaged until the key 41 is released because of the action of special delay mechanism brought into play by the rearward displacement of the division control slide 239. A pin 289 on slide 239 (FIG. 5) lies in back of a delay latch lever 291 (FIG. 4) pivoted on a screw 292 secured to the right side frame 60. The upper end of the lever 291 is provided with a hook portion 293 and is urged rearwardly by a spring 294. The spring 294 also serves to hold the arm 291 in contact with the pin 289, whereby the hook end is spaced from its cooperating notch 296 provided in the clutch pawl 119. Rearward movement of the control slide 239 thus enables the delay latch lever 291 to rock rearwardly, whereupon the hook 293 will engage the notch 296. In this situation, the clutch pawl 119 is maintained in clutch-disengaging position irrespective of the release thereof by the control lever 122, which has been rocked (clockwise in FIG. 4) by the rearward movement of clutch slide 151 (FIG. 5) and pin 152 thereon. Subsequently, the return movement of the slide 239 forwardly, upon release of the division key 41, rocks arm 291 away from pawl 119, permitting the clutch to become engaged. This construction guarantees that the clutch cannot engage prematurely, i.e., before the parts are conditioned for operation, and the release of the division key 41 will permit a relatching of the division actuator 253 in the first machine cycle.

Referring to FIG. 8 of the drawings it will be observed that the program control shaft 274 extends through the control plate 136 and is provided on its right-hand end with a small mutilated gear 297. This gear 297 and its shaft 274 are adapted to be moved axially into, and out of, the normal plane of a large mutilated driving gear 298 integrally mounted with a wide-faced idler gear 299. Conventionally, the large mutilated gear 298 and its integral idler are rotatably mounted on a stub shaft 302 secured to the control plate 136, and are held away from the control plate 136 by a suitable collar—only the mutilated gear 297 being shiftable axially with the shaft 274. In my present invention, however, the gear 298, and its idler 299, are mounted on a collar 301, which collar is also slidably and rotatably journalled on the stub shaft, so that both mutilated gears 297 and 298 are shiftable axially, as will be described more in detail hereafter under the heading "Inactivation of Division Programming Drive Gear." The idler gear 299, as is conventional, meshes with the drive gear 258 on the power shaft 81, so that when the clutch is engaged and the shaft 81 rotates, the gear 258 will drive the gear 299 and the large mutilated gear 298. The small mutilated gear 297 is normally located to the left of the plane of the gear 298, so that the program control shaft 274 is normally inoperative. As shown in FIG. 6, the program shaft 274 is normally urged toward the left, as viewed from the front of the machine, by means of a spring 303 surrounding the shaft 274 and compressed between a collar 304 pinned to the shaft and an arm 306 of a bracket 307 secured to the rear face of the auxiliary bearing plate 66. Hence the mutilated program gear 297 is urged to a position where it lies against the right-hand side of the control plate 136, with a notch formed in the periphery of the gear engaged over a pin 308 (see FIG. 7) mounted on the control plate.

As seen in FIG. 8, the small gear 297 has three equally spaced sets of three teeth, each set of which is arranged to cooperate with a single set of two teeth provided on the large mutilated gear 298. As the latter gear rotates (in a counter-clockwise direction in FIG. 8) during cycling of the machine, its two teeth are so positioned thereon as to engage with one of the sets of three teeth on the gear 297 (if that gear and its shaft have been projected to the right), just before the end of a machine cycle. Hence when the small mutilated gear is projected into the path of the large gear 298, by means hereinafter to be described, the gear 297 will be rotated clockwise through one-third of a revolution at the end of the instant cycle and also through one-third of a revolution at the end of each of the two next succeeding cycles. The gear and shaft are maintained in their right-hand projected position for these three cycles by the engagement of the pin 308 with the left-hand web of the gear 297.

Referring to FIGS. 5 and 6, the division control lever 267 bears a stud 311 which lies beneath the forward end of an arm 312 secured to the transversely extending shaft 313 (see also FIGS. 2 and 7) which is journalled between the control plate 136 and the left side frame 61 of the machine. Also secured to the shaft 313, at the left side of the machine, is an overdraft setting arm 314 which is provided at its forward end with a stud 316 engaged in the elongated slot provided in the lower end of an overdraft control link 317. This link 317 is pivoted at its upper end on a pivot stud 318 secured to a yoke 319 which is fastened on an extension of the highest order tens-transfer detent pin 104. As mentioned earlier herein, when a tens-transfer is effected from one order of the accumulator to the next higher order, the pin 104 of the higher order will be moved forwardly as a consequence of the forward movement of the higher order gear 99 for the purpose of placing this gear into the path of the tens-transfer actuating tooth 101. Hence when a tens-transfer occurs into the leftmost, or highest, inboard order, the movement of its detent pin 104 will cause the link 317 to be moved forwardly.

As shown in FIG. 2, the forward end of the link 317 is normally held in an inactive position by the spring 321. However, upon depression of the division key and rocking of the control lever 267, the shaft 313 and arm 314 will be rocked (clockwise as viewed in FIG. 2), thereby causing the pin 316 to lift the forward end of the link 317. Such lifting of the forward end of the link 317 positions it directly behind the lower section of a web, or bail, of a division control flag 322 pivotally mounted on the division control shaft 274. When the link 317 is moved forwardly as a result of the forward movement of the leftmost detent pin 104, the flag 322 will be rocked (clockwise as viewed in FIG. 2) against the resistance of its spring 323 (see FIGS. 6, 7 and 9). Such rocking of the flag 322 moves an upwardly extending finger 324 thereon into the path of travel of a pin 326 carried by a flag actuator disk 327 which is mounted on the leftmost actuator shaft 77. Hence as the shaft 77 rotates, the pin 326 will engage the finger 324 and displace the flag 322 to the right. Inasmuch as the flag 322 is prevented from moving axially on the shaft 274 by means of a collar 328 and a cam 329 which are pinned to the shaft 274 at either side of the flag bail, as clearly seen in FIGS. 6 and 9, this shaft and the small mutilated gear 297 will likewise be displaced to the right, so as to bring the gear 297 into the plane of the large gear 298. Thus the shaft 274 and the division program cam 273 (FIG. 5) will be given three steps of rotational movement during the next three cycles of the machine, after which the gear 297 will drop back over the pin 308 to its inactive position and shaft 274 will be returned to the left by the force of its spring 303. In the meantime, the overdraft control link 317 will have been moved rearwardly so as to release the flag 322, due to the restoration of the detent pin 104 by the restoring cam 103.

When the program cam 273 occupies the position shown in FIG. 5, which is the position of the cam when the notch in the mutilated gear 297 engages with the pin 308, the control lever 267 will be so positioned as to hold the add-subtract control slide 141 in its forward position whereby the subtract gears 84 are engaged with the accumulator gears 86. The machine will, therefore, be set for subtraction and the value of the divisor set up on the value keys 29 will be repeatedly subtracted from the accumulator (dividend) dials 22 each time the machine makes one cycle of operation. At the end of the cycle in which the overdraft occurs in the accumulator, the program shaft 274 will be displaced toward the right from the operation of the mechanism described above. Thereupon the shaft 274 is rotated (counter-clockwise in FIG. 5 or clockwise in FIG. 8) one-third of a revolution, and the cam 273 rocks the division program arm 269 (counter-clockwise in FIG. 5), thereby moving the control lever 267 toward the rear of the machine so as to cause the add gears 83 to move into mesh with the gears 86. Therefore, during the following cycle of operation of the machine, the divisor will be added back into the accumulator so as to correct the overdraft. At the end of this cycle the program control shaft 274 and cam 273 will be rotated another one-third of a revolution, or 120°, thus moving the lever 267 to an intermediate position in which the add and subtract gears 83 and 84, respectively, will be held out of engagement with the accumulator gears 86 so as to permit an ordinal carriage shifting operation. The arm 269 is yieldably maintained in this intermediate position by means of a spring-urged centralizer arm 331 provided with a V-shaped nose which is adapted to engage in a corresponding notch provided in the upper edge of the arm 269.

In order to cause the carriage 21 to be shifted one ordinal position to the left during the second machine cycle following the overdraft, there is provided a shift control cam 332 secured on the shaft 274 which has a node 333 thereon (FIGS. 4 and 6). Upon displacement of the shaft 274 toward the right by the mechanism described above, the node 333 of cam 332 is moved toward the follower arm 334 which is secured on a hub 336 pinned to a transversely disposed shaft 337. This shaft 337 is slidably journalled at its right-hand end in the right side frame 60 and at its left-hand end in the arm 306 of the bracket 307, so that it can be shifted axially as well as rocked. The hub 336 (see FIG. 7) is provided with a flange 338 which, together with the follower arm 334, provides an annular groove for receiving a finger 339 of a bellcrank lever 341 pivoted on the bracket 342 secured to the right side frame 60. The bellcrank 341 is provided with a forwardly directed arm 343 which lies over the left-hand portion of the stud 311 carried by the lever 267. Hence when the lever 267 is rocked (clockwise in FIG. 5), the stud 311 will lift the arm 343 and thereby rotate the bellcrank 341 (counter-clockwise if viewed from the front of the machine, or clockwise in FIG. 7). Such rocking of the bellcrank 341 moves the shaft 337 and follower arm 334 to the left against the opposition of a compression spring 344 mounted on the shaft 337 at the extreme left end thereof (FIG. 6). This leftward movement of the follower arm 334 is sufficient to bring the arm into the plane of the node 333 when the shaft 274 occupies its active, right-hand position. The node 333 is so located on the cam 332 as to cause the follower arm 334 to be rocked (clockwise as viewed in FIG. 4) and held in this position during the shift cycle, i.e., the second machine cycle following the overdraft. Through means later to be described (see section entitled "Division Aligner Mechanism"), this rocking movement of the arm 334 and shaft 337 will cause the left shift clutch to be engaged and thereby cause the carriage to be moved one ordinal space to the left. At the end of the shift cycle, the cam 273 will be rotated another one-third of a revolution, or the final 120°, so as to again cause the subtraction gears 82 to be engaged with the gears 86, and once again cause the divisor to be subtracted from the dividend. When the cam 273 reaches this final (third) position, the notch in the small mutilated gear 297 will again register with the pin 308 and permit the gear and the shaft to be moved toward the left under the influence of the compression spring 303. This terminates the operation of the program control shaft 274 until the repeated subtraction of the divisor once again causes an overdraft in the accumulator, whereupon the program control mechanism will once more be set into operation so as to cause the above-described sequence of operation of the machine.

(h) *Counter Control in Division*

During a division operation it is usually desirable that a true quotient be had, i.e., that the number of subtractions be counted positively in order to secure the correct number of such subtractions. In that event the sign character of the registrations in the revolutions counter (quotient register) must be unlike the registrations in the accumulator (dividend register). However, there are occasions when the operator desires a "negative quotient," i.e., one in which the number of subtractions are counted negatively to secure a complement of the true quotient. In that event registrations in the revolutions counter and the dividend register will be of like sign character. Means are provided for selective control of the quotient registration and for this purpose a key 42 is mounted adjacent the division control key 41 for endwise sliding movement by slots provided in its key stem 346 (FIG. 8) embracing studs 347 on control plate 136. Key 42 is normally biased to the inoperative position shown by a spring 348. A lever 349 is pivotally mounted on the control plate 136 adjacent key stem 346, and has an inclined cam surface 351 at the lower extremity thereof for cooperation with a roller 352 mounted on the lower end of the key stem. The lever 349 is normally urged into engagement with the roller 352 by spring 356. At its upper extremity, lever 349 supports a rearwardly extending link 353 by a suitable lost motion connection, such as a pin-and-slot connection 354. At its rearward end, link 353 is pivotally connected to a counter control lever 357 pivoted at 358 on the control plate 136. It is obvious that depression of key 42 rocks the control lever 357 counter-clockwise (FIG. 8).

The sign character of registrations in the counter is selectively determined by the counter control mechanism, indicated generally at 360 (FIG. 8). It comprises the counter setting member 361 having respective upper and lower notches 362 and 363 adapted for engagement by respective pins 364 and 365 carried at the forked end of an arm 367 which is pivotally mounted by a screw 368 to the rearward end of the add-subtract control slide 141. Arm 367 is normally spring-urged downwardly by a spring 369 to engage pin 364 in notch 362 of member 361. It will be seen that the engagement of either pin 364 or 365 in its corresponding notch 362 or 363 determines the direction of rocking movement of member 361, from the centralized position shown, in response to a given movement of the add-subtract slide 141. By this means, the direction of registration of the revolutions counter can be reversed with respect to a given direction of registration of the accumulator. With the arm 367 in the normally spring-urged position shown in FIG. 8, each registration in the counter will be of like sign character as that in the accumulator. On the other hand, if arm 367 is rocked clockwise to engage pin 365 with its notch 363, each counter registration will be unlike that in the accumulator.

As previously stated, optionally operable control means are provided whereby the operator can, if he desires, set the machine to provide for a positive quotient in the revolutions counter during division operations. The juxtaposed relation of the key 42 with the division key 41 is such that the two can be easily operated together by a single manual stroke, or the division key 41 can be operated alone if so desired. The lever 357 has a foot (not shown) extending therefrom in a well-known manner and underlying pin 364 on arm 367, so that counter-clockwise rocking of lever 357 serves, through the foot, to raise pin 364 from its notch 362 and engages pin 365 with its corresponding notch 363. Therefore, it can be seen that upon simultaneous depression of keys 41 and 42, the forward and rearward movement of the add-subtract slide 142 is effective to cause an unlike sign character of registration in the counter with respect to the accumulator. A conventional latch member 371 is provided for cooperation with a pin (not shown) on the lower end of lever 357 and is operative, upon the initiation of a division operation, to maintain arm 367 in either adjusted position. It is believed that the operation of the counter control mechanism will be apparent from the foregoing description. However, for a more complete description thereof, reference is to be had to Patent No. 2,294,111, granted to Carl M. Friden on August 25, 1942.

(i) Add Key Disabling Means

In a division operation it is necessary that the divisor set in the value keys 29 be permitted to remain undisturbed throughout the division operation. As mentioned earlier herein, the present machine is provided with an add key 34 which, when rocked forwardly (counter-clockwise from the position shown in FIG. 8) will cause the value keys 29 to be released at the end of each cycle of machine operation. In order to prevent this action from occurring during a division operation, means is provided for disabling the operation of the key release mechanism during division operations even though the add key 34 is rocked to its forward, or operative, position.

The conventional add key mechanism comprises a link 379 (FIG. 4) which is pivotally mounted at 381 on a bellcrank lever 382. The bellcrank 382 is pivoted at its elbow on a pivot stud 376. Conventionally, arm 379 is provided at its forward end with an upstanding lip (not shown) which lies in front of a projection 383 (partially seen in FIG. 4) formed on the conventional clear bail (not shown). The forward end of the link 379 is resiliently biased upwardly by a spring (not shown) in order to normally cause the lip thereon to engage the projection 383. The bellcrank can be oscillated in the latter portion of a machine cycle by conventional means (not shown), such as that described in the patents to Moody et al., No. 2,714,986 or Machado, No. 2,714,990. Such a mechanism is enabled or disabled for operation by the positioning of the add key 34, which, through a link 386, controls the positioning of the operating mechanism. Obviously the rocking of bellcrank 382 will cause longitudinal translation of the link 379, whereupon the engagement of its lip with the projection 383 will rock the clear bail (not shown). As is well-known in the art, when the clear bail is rocked, toward the end of the machine cycle, any depressed value keys will thereby be released.

However, in division operations, the add key mechanism should be disabled and this is readily accomplished by rocking the front end of link 379 downwardly (counter-clockwise from the position shown in FIG. 4), so as to prevent engagement of its nose with the projection 383. For this purpose, the upwardly extending arm of the bellcrank 284 (FIG. 5) is provided with an inclined cam face 372 which lies beneath a pin 373 mounted on the rear end of a lever 374 (FIG. 4) pivotally mounted on the right side frame 60, as on pin 376. At its forward end, the lever 374 is provided with a camming nose portion 377 which cooperates with a roller 378 mounted at an intermediate position on the link 379. Thus the rocking of bellcrank 284 (counter-clockwise in FIG. 5) causes the inclined cam face 372 to cam the pin 373 upwardly, thereby rocking the lever 374 (counter-clockwise in FIG. 4), so as to depress the link 379. The subsequent translation of the link is then ineffective, for its lip is positioned below the projection 383 and it is incapable of operating the clear bail.

In the conventional Friden machine with which my invention is preferably associated, the divisor will be cleared from the keyboard in the last cycle of the division operation due to the fact that the division control lever 267 (FIG. 5) will be released from the latch lever 281 (FIG. 4) at this time. Thereupon the division control lever 267 and bellcrank 284 (FIG. 5) are restored to their normal, inoperative positions by spring 288, thereby releasing pin 373 (FIGS. 4 and 5). The release of pin 373 permits link 379 to be restored to the position shown in FIG. 4 by means of the spring (not shown) which resiliently biases the front end of the link into engagement with projection 383 of the keyboard clearing bail. As this takes place in the early part of the last cycle of a division operation, and the clearing takes place just before the end of the cycle, the divisor will be cleared from the keyboard as the operation comes to an end.

(j) Division Stop Mechanism

It is sometimes desirable to stop the automatic operation of the machine before the completion of a division operation, and for this purpose the division stop key 43 is provided. This division stop key 43 is provided in the form of a lever 393 (FIG. 4) pivotally mounted on a screw 394 secured to the right side frame 60. In its preferred form, as shown in the Machado Patent No. 2,714,990, this lever is operable forwardly or rearwardly in the machine from the central position shown. The lever 393 is yieldably held in either the normal position shown in FIG. 4 or in the forward position by means of a spring-urged detent lever 396 which is urged (counter-clockwise in FIG. 4) by means of a spring (not shown but conventional in this machine) into engagement with one or the other of a pair of notches formed in the lever 393. The lever 393 is provided at its rear end with the camming nose 399 which lies immediately above an ear 401 on the division latch hook 281. Hence when the operator moves the lever 393 rearwardly, the nose 399 will engage the ear 401 and rock the latch 281 so as to cause immediate release of the half-round pin 279. The control lever 267 will thereby be permitted to drop under the influence of the spring 288 (FIG. 5) and so bring the machine to a stop at the end of the machine cycle during which the lever 394 was operated. However, when it is desired to terminate the division operation with a true quotient figure appearing in the counter dials 23, the lever 393 is moved forwardly from the position shown in FIG. 4, in which position it is latched by detent 396. An arm 402 is pivoted on the screw 394 and is urged to follow rocking of lever 393 (counter-clockwise in FIG. 3 in this instance) by means of a spring 403 stretched between an ear formed on the lower edge of arm 402 and an ear formed on the upper edge of lever 393. Such movement (counter-clockwise in FIG. 4) is normally limited by engagement of the lower ear of arm 402 with the lower edge of the lever 393. Hence when the lever 393 is rocked forwardly (counter-clockwise in this figure), the rear end of the arm 402 will engage with the underside of ear 401 on the latch 281, and upon further movement of the lever 393 will cause stretching of the spring 403. The spring-urged detent 396 will maintain the lever 393 in its forward position until just prior to stoppage of the machine, at which time the lever will be restored to its normal position by restore means not shown herein, but fully shown and described in Patent No. 2,653,765 mentioned hereinbefore.

When the division control lever 267 (FIG. 5) is moved rearwardly at the end of the cycle in which an overdraft occurs, the latch 281 will be rocked (counter-clockwise in FIG. 4) due to the rearward travel of the pin 279, whereupon ear 401 on arm 281 will move rearwardly of the shoulder at the end of the arm 402. Thereupon the shoulder on arm 402, due to the effect of the spring on the arm, latches against ear 401 and will block return rocking of the latch arm 281. Hence when the control lever 267 is moved forwardly at the end of the additive correcting cycle preparatory to the shifting of the carriage, the pin 279 will be pulled off of the latch 281 and the lever 267 permitted to drop, thereby causing the division operation to be terminated at the end of the shift cycle.

Inasmuch as it is ordinarily desirable to permit the divisor standing in the keyboard to remain at the termination of a division operation which has been effected by means of the division stop key 43, conventional means is provided for preventing the release of the value keys when this stop key is manipulated. As shown in FIG. 4, the lever 393 carries a pin 404 which passes through an aperture in the right side frame 60 and cooperates with the well-known mechanism shown in the Machado Patent No. 2,714,990 to lift the rear end of the lever 374 whenever the lever 393 is manipulated in either direction to stop a division operation. As explained in the preceding section, such rocking of lever 374 disables the add key link 379, and the value keys will not be released at the end of the terminating cycle. The divisor will, therefore, remain set in the keyboard, in readiness for a continuation of the division operation, if such should be desired.

In the event the division operation is permitted to proceed to its conclusion, the machine will be stopped by means of a conventional pawl (not shown) located on the right-hand end of the carriage 21 which will move behind the finger 406 of the latch 281 when the division control lever 267 moves rearwardly for the add-back cycle and thus cause the pin 279 to be pulled off of the latch when the lever 267 moves forwardly for the shift cycle of the division operation. This mechanism is conventional and is fully shown and described in the Friden Patent No. 2,327,981, mentioned above.

(k) Division Aligner Mechanism

Division operations are normally performed on the present machine by first presetting one of the tabulator buttons 55 to control the ordinal position of the carriage in which the dividend will be placed. The dividend is then set by depressing the appropriate keys 29, and the dividend entry key 56 is depressed. The depression of this key 56 results in the initiation of operation of the machine, in which the carriage shifts to its left end position, the accumulator (dividend) and revolutions counter dials 22 and 23, respectively, are reset to "0," and, finally, the carriage shifts toward the right until it reaches the position selected by a depressed tabulating key 55. At this point, the shifting terminates and the dividend is entered automatically into the accumulator dials by mechanism fully described in the patent to Friden No. 2,403,273, after which operation the machine comes to rest. Following the entry of the dividend as described above, the divisor will be set in the value keys 29 and the division key 41 depressed so as to initiate an automatic division operation.

In most calculating machines on the market, the operator must determine, before depressing the division key, that the dividend and divisor factors are properly aligned, for if the divisor lies to the right of the highest order of the dividend, an unduly large number of cycles are required to effect the division. In the preferred form of my invention, the machine is provided with an automatic dividend-divisor aligning mechanism, such as that shown in the patent to Machado, No. 2,653,765. When an automatic aligning mechanism is employed for automatically aligning the dividend and divisor preparatory to a division operation, it is rendered operative by depression of the division key 41. In this event, if the highest orders of the dividend and divisor are not aligned, the aligning mechanism shifts the carriage to the right until they are, or until the carriage is in its extreme right-hand position. In a few instances it was found that the dividend factor was standing in such a high order of the register, or the divisor was placed in such a low order of the keyboard, that the two factors were not aligned when the carriage was in its extreme right-hand position. The present invention is designed to remedy that defect. It can be mentioned here that when the dividend and divisor factors cannot be aligned and more than eleven machine cycles are required before a true overdraft occurs, the automatic dividend restore mechanism of the present invention, which is fully explained hereafter in Section II, will be rendered operable to restore the dividend back into the accumulator dials 22 from which it was subtracted, whereupon the machine will be brought to rest and the operator is then notified that the factors are misaligned.

It is worthwhile to note here that the dividend-divisor aligner mechanism is not essential to the operation of the present invention, inasmuch as the automatic restore mechanism of my present invention can be constructed and arranged to operate in any calculating machine capable of performing division. However, since it is preferable to incorporate the instant invention into machines of the type disclosed in the Machado et al. patent, No. 2,653,765 mentioned above, and since this mechanism is the more difficult to understand, the following description is given in order that a complete understanding of the operation of this invention can be had.

Referring now to FIGS. 6 and 7 of the drawings, it will be recalled that upon depression of the division key, the shift control shaft 337 is shifted axially (to the left in FIG. 6) against the force of the spring 344, and, also, that the shaft 337 is rocked clockwise, as viewed from the right-hand side of the machine, during each shift cycle of the automatic division operation. Secured to the shaft 337 is a rearwardly extending arm 407 which carries a transversely extending pin 408 at the rear end thereof. The pin 408 is loosely embraced in an aperture provided in a left shift arm 409 which is secured to the left-hand end of a sleeve 411 slidably and rotatably mounted on shaft 337. The sleeve 411 is urged toward the right by means of a compression spring 412 but normally is restrained against such movement by means of a pair of latch levers 413 and 414, which are pivotally mounted on a screw 416 fastened in the formed-over ear 417 provided on the arm 407 (FIG. 7). The latches 413 and 414 are provided with similar latch shoulders 415 which are urged into engagement with the face of the left shift arm 409 by appropriate springs tensioned between an ear of the respective latches 413 and 414 and the rear end of arm 407. As stated above, the left shift arm 409 is secured to the left-hand end of sleeve 411, while a right shift arm 418, similar to arm 409, is secured to the right-hand end of the sleeve. The rear ends of the shift arms 409 and 418 are provided with pressure faces which are adapted to engage with corresponding faces provided on the ears of the left and right shift controllers 178 and 179, respectively. When the machine is at rest, the left shift arm 409 is in alignment with the ear of the left shift controller 178, while the right shift arm 418 lies to the right of the ear provided on the right shift controller 179 and is, therefore, in an inoperative position with respect to the shift controller 179 which controls the right shift clutch-engaging arm 182 of the machine. However, when the division key 41 is depressed and the shaft 337 shifted toward the left, the arm 418 will be brought into alignment with the ear of the right shift controller 179, so as to be in a position to control engagement of the right shift clutch-engaging arm 182, while the other arm 409 is moved out of alignment with its corresponding ear so as to prevent operation of the left shift clutch-engaging arm 181. Hence, when the program control mechanism is rendered active in order to control the add, shift, subtract sequence of operation of the machine, the right shift clutch-engaging arm 182 will be operated at the beginning of the shift cycle to cause carriage 21 to be shifted one ordinal space to the right. At the conclusion of the shift cycle, the node 333 on the cam 332 will move from beneath the arm 334 and a spring 419 (see FIG. 7), tensioned between the bottom of the left shift arm 409 and the shaft 313, will restore the shift arms and shaft 337 to their normal, inoperative position.

In order to cause repeated cycling of the program control shaft 274 during the automatic aligning operation, a slide 421 (FIGS. 6, 7 and 9) is mounted for sliding movement on the bracket 307. As shown in FIGS. 6 and 7, the arm 306 of the bracket is provided with a formed-over ear 422 which carries a screw 423 which engages with an elongated slot provided in the slide 421. The bracket 307 also has a second arm 424 having a formed-over ear 426 integral therewith, which carries a screw 427 which is received in the second elongated slot provided in the slide 421, whereby the slide is guided for transverse shifting movement within the machine. On its right-hand end, the slide 421 is notched for engagement with the edge of the left shift arm 409. On its left-hand end, the slide 421 has an inclined camming face 428 which overlies the rearwardly extending tail portion 429 provided on the flag 322. Hence, when the sleeve 411 is shifted to the left with the shaft 337 at the beginning of a division operation, the slide 421 will likewise be shifted to the left. The engagement of the cam face 428 on the slide with the tail 429 of flag 322 will cam the tail downwardly, thereby rocking the finger 324 of the flag 322 into alignment with the pin 326. Thus, later in the first cycle of operation, the pin engages finger 324 and shifts the control shaft 274 toward the right to thereby initiate a division program of add, shift, and subtract. Inasmuch as the flag 322 is held in its rocked, or active, position by the slide 421, the program control shaft 274 will be repeatedly cycled, and will thereby cause a one-step shifting movement of the carriage to the right for every three cycles of the machine. This shifting of the carriage to the right will be continued until both the latches 413 and 414 have been tripped by mechanism hereinafter to be described in this section, so as to release the sleeve 411 to the action of its spring 412. Thereupon the left shift arm 409 will move into alignment with the ear of the left shift controller 178 to cause the left shift clutch member 183 to be engaged each time the shaft 337 is rocked. At the same time, the slide 421 will be moved toward the right, so as to release the tail 429 of flag 322 and thereby permit the flag to be once again placed under the control of the overdraft control link 317. Hence, once the latches 413 and 414 have been operated, releasing the sleeve 411, the program control mechanism will function in its normal manner to bring about an automatic division operation and cause the dividend to be divided by the divisor in the conventional manner.

As shown in FIGS. 2 and 6, the shaft 313 has secured to the left-hand portion thereof, an arm 431 which bears a stud 432 underlying an arm 433 that is pivoted on the stud 434 secured to the left side frame 61. The arm 433 has integrally formed thereon a downwardly extending arm 436 which is provided with the bent-over ear 437, as clearly seen in FIG. 2. Also freely pivoted on the stud 434 is a lever 438 having a downwardly extending arm provided with a bent-over ear 439 which is yieldably connected with the ear 437 by means of a spring 441. The upper end of the lever 438 is provided with a rearwardly extending finger 442 which lies below the cam 329 mounted on the left end of the control shaft 274. Hence, when the shaft 313 is rocked (clockwise in FIG. 2) at the beginning of a division operation, the arm 433 will be elevated by the stud 432 so as to move ear 437 away from the rear edge of the depending arm of lever 438, thereby tensioning the spring 441 and urging the finger 442 into engagement with the underside of the cam 329. The cam 329 is provided with a flat cam face which lies parallel with the upper edge of the finger 442 when the shaft 274 is rotated to its carriage shift position.

The upper end of arm 438 is formed as a slot which embraces a pin 443 on the lower end of a lever 444 pivoted on a pin 446 mounted on the frame plate 61. Thus, at the beginning of a carriage shift cycle, the spring 441 will rock the arm 438 (counter-clockwise in FIG. 2), thereby rocking the lever 444 (clockwise in this figure). The upper end of lever 444 is pivotally connected to a sensing finger 447 which is adapted to cooperate with the conventional "0" sensing slides 448 in the well-known manner, which slides are mounted for sliding movement in the outboard portion of the carriage 21. As fully described in Patent No. 2,653,765 mentioned above, each of the sensing slides 448 is provided at its forward end with an enlarged head which is guided for sliding movement in suitable slots within the channel bar 103 extending across the front of the carriage 21. The slides 448 are provided with a series of arms (not shown) extending at a right angle thereto which are arranged in overlapping relationship, whereby any higher order slide that is held in its forward position will also hold all the slides to the right thereof in their forward positions. Each slide 448 is provided at its rear end with a V-shaped nose which is adapted to cooperate with a "0" notch in a cam provided on each of the associated numeral dial shafts 87. The "0" notch of each cam is so constructed and arranged that whenever any of the dials 22 are located in their "0" registration position, the notch in the cam will lie in line with the nose on the associated sensing slide. In any other position of the number dial, however, the nose of the sensing slide will lie opposite an unbroken portion of the periphery of the "0" cam and thereby be blocked from rearward movement. Thus, when the lower end of the lever 444 is urged forwardly, as previously described, the upper end of the lever will be urged rearwardly so as to cause the sensing finger 447 to press against the forward end of the sensing slide 448 aligned therewith. If the dial being sensed, or any of the dials to the left thereof, contain a value other than "0," the sensing finger will be unable to push its related slide 448 rearwardly and will thereby be blocked against rearward movement. However, when the slide being sensed by the finger 447 lies opposite a "0" notch in the "0" cam and all of the higher order slides likewise lie opposite a "0" notch, the sensing finger 447 will be moved rearwardly by the spring 441 during the shift cycle, thereby allowing the lower end of the arm 444 to move toward the front of the machine (clockwise in FIG. 2).

Pivotally connected to the lower extremity of lever 438 is a link 449 which is pivotally connected at its opposite end to an arm 451 formed on a bail 452 which is freely pivoted on the shaft 313. As shown in FIGS. 6 and 9, this bail 452 is provided at its right-hand end (left-hand end in FIG. 7) with the finger 453, the upper end of which lies behind the left end of the lower latch 414. Hence when the link 449 is moved rearwardly by lever 438, the bail 452 will be rocked (counter-clockwise when viewed from the right side, as in FIG. 2), thereby rocking the latch 414 counter-clockwise (FIG. 6) so as to release the shifter arm assembly from restraint by the latch 414. However, the lower latch 414 is somewhat shorter than the upper latch 413, i.e., the distance between the similar latching shoulders 415 and the pivot screw 416 is slightly less in the case of this lower latch 414 than in the case of the upper latch 413. Consequently, when the lower latch 414 is rocked, the spring 412 will cause the sleeve 411, and shift arms 409, 418 secured thereto, to escape slightly to the right until the arm 490 contacts the latching shoulder 415 of the longer (upper) latch 413. Therefore, once the sensing mechanism for the numeral dials 22 has sensed "0" in the order being sensed by the finger 447 and all higher orders, the shift arms 409, 418 and the sleeve 411 will be permitted to escape slightly to the right so as to thereafter be under the control of the longer latch 413 alone.

The latch 413 is released under the control of the conventional overdraft sensing mechanism, i.e., the highest order transfer pin 104. For this purpose the overdraft control link 317 carries a stud 454 which lies above the forwardly extending arm 456 formed on the left-hand end of a bail 457 which, like the bail 452, is pivoted on the shaft 313. The arm 456 is provided with a nose at the distal end thereof, which nose is adapted to be engaged by the stud 454 when the overdraft link 317 is moved forwardly in response to a tens-transfer effecting the highest order transfer pin 104. The arm 456 will thereby be rocked (counter-clockwise in FIG. 2). At its right-hand end (see FIGS. 6 and 9), the bail 457 is provided with a finger 458 which lies behind the longer latch 413. When a tens-transfer occurs which effects the highest order pin 104, the finger 458 will thus be rocked forwardly so as to rock the long latch 413 (counter-clockwise in FIG. 6), thereby releasing the sleeve 411 and the shift arms 409, 418 to the influence of the spring 412 if short latch 414 has also been released. The spring will thereupon shift the assembly to the right so as to bring the arm 409 into alignment with the ear of the left shift controller 178. This will effectively reverse the direction of the carriage shift under the control of the program control mechanism, and at the same time will cause the slide 421 to release the tail 429 on the flag 322 so as to enable the flag to be controlled by the overdraft control link 317 in a normal division operation.

In connection with the mechanism just described, it will be noted that the latches 413 and 414 must be released in a predetermined sequence in order to permit shifting of the sleeve 411 so as to change the setting of the shift mechanism from right shift to left shift. In other words, the long latch 413 may be repeatedly released by finger 458 with no effect unless the short latch 414 has been previously released. In this case, the long latch 413 will be moved back into latching position by its spring when the finger 458 moves away from the latch upon restoration of the tens-transfer pin 104. However, after the carriage has been shifted to a position where only "0's" are sensed by the finger 447, the short latch 414 will be released at the beginning of the shift cycle and the shifter arm assembly will escape slightly to the right until caught by the long latch 413. The short latch 414 cannot thereafter re-engage with the latching face provided on arm 409 and will remain disabled for the balance of the operation. Consequently, when the highest order transfer pin 104 moves forward, as the result of an overdraft in the accumulator, the long latch 413 will be released and the shift arm assembly will be permitted to complete its right-hand shifting movement so as to condition the machine for division.

As clearly pointed out in the above-mentioned Machado et al. patent, No. 2,653,765, the sensing finger 447 senses the accumulator dial 22 located in the eleventh order of the machine, when the carriage 21 is in its extreme leftmost position. Since the dial in the eleventh order and all higher order dials must stand at "0" in order to enable the short latch 414 to be disabled at the beginning of the shift cycle, and since the highest order transfer pin 104 lies between the eleventh and twelfth orders of the machine, the effective release of the sleeve 411 by the long latch 413 can only occur as the result of a true overdraft in the accumulator, i.e., an operation in which the dials 22 in the eleventh and all higher orders move from "0" to "9."

In order to ensure that the sensing finger 447 is permitted to move rearwardly and thereby trip the short latch 414 when the carriage is in its extreme right-hand position, the sensing slide 448 associated with the leftmost (highest outboard order) numeral dial 22 is provided with a shortened head. Hence when the carriage has been shifted all the way to the right, the sensing finger will be moved to the rear during the shift cycle regardless of whether or not a significant digit appears in the leftmost numeral dial 22.

It is also conventional, in machines of the type presently being described, to provide a dummy sensing head secured to the carriage rail 108 at the right of the series of sensing slides, i.e., the eleventh order in the carriage. When the carirage is in its extreme left-hand position, the dummy head will lie immediately behind the sensing finger 447 and so prevent the short latch from being disabled when the carriage is in this position.

Means must also be provided for causing the long latch 413 to always be released when the carriage has reached its extreme right-hand position regardless of whether an overdraft has occurred in the accumulator or not. In order to prevent the aligner mechanism from indefinitely repeating its cycles of add, shift and subtract when the carriage is in its extreme right-hand position, and a true overdraft cannot occur in the first cycle, there is provided means for tripping the long latch during a carriage shifting operation. Thereupon the division mechanism will operate in a conventional manner. As shown in FIG. 6, the bail 457 is provided with an upstanding finger 461 which lies in front of a lever 462 pivotally mounted at 463 on an extension of the rear bearing plate 68. The lever 462 is also provided with a roller 464 rotatably mounted on a right angle projection at its rear end, which roller lies beneath the left-hand end of the lever 218. Consequently, when the lever 218 is rocked, as a result of an operation of the left-hand override pawl 229, the left-hand end of the lever 218 will be forced downwardly, due to the action of the bellcrank 223 described above, and thereby cause the lever 462 to be rocked upwardly. The finger 461 will thereby act on the bail 457 to rock the finger 458 forwardly and cause the long latch 413 to be released. In this carriage position, the short latch is also released by the "0" sensing arm 447 engaging the simulated short sensing slide 448 associated with the dial in the sensing order.

If an overdraft of the accumulator does not occur before the carriage reaches its extreme right-hand position, an overdraft will be simulated at this time by the mechanism discussed in the preceding paragraph and the shifter arm assembly is released from the long latch so as to set the machine for normal division operation, or repeated subtraction. This subtraction can run indefinitely if the two factors are not aligned by this time.

II. DIVIDEND RESTORE MECHANISM

The machine with which my invention is preferably associated, as has just been described, includes a dividend-divisor aligning mechanism. In such a machine, continuous subtraction is initiated as soon as the carriage has reached its extreme right-hand position regardless of whether there is a tens-transfer, either in the first cycle in that order or in any subsequent cycle. Thus, if the dividend and divisor are not properly aligned by that time, the machine will continue to cycle indefinitely. In other machines which do not have the dividend-divisor aligning mechanism, the continuous subtraction is commenced upon depression of the division key. If the operator has not properly aligned the two factors prior to depression of the division key, and the highest order of the dividend lies to the left of the highest order of the divisor, then continuous subtraction is initiated and will run indefinitely. In both instances, in the past, the operator would become aware of the fact that the factors were not properly aligned only from the machine operating continuously through a large number of machine cycles without the overdraft and carriage shifting resulting therefrom. In most instances the operator simply stopped the division by a stop mechanism which is conventional in this art, and would then have to clear the machine and start the operation over again. Ordinarily this would involve manually putting the dividend in the dividend register. However, in some instances, the dividend has been accumulated through a number of prior operations and without manual insertion of the dividend into the keyboard, as is normally the case. When this happens, the operator must proceed through the entire step-by-step program up to the division operation in order to have the proper dividend. My invention is intended as an automatic mechanism which will correct this difficulty by counting the number of successive subtractions, and, if by a predetermined number of machine cycles (preferably eleven) a true overdraft has not been secured, the mechanism will automatically reverse the sign character of the operation and add the divisor back into the dividend the same number of times that it had been subtracted. Thus both the dividend and the quotient registers are restored to their original condition. It is obvious that if, after ten cycles of operation, the subtraction of the divisor from the dividend has not created a true overdraft, then the highest order of the two factors are not aligned. In my invention the operation through ten or more subtractions (from the mechanical standpoint, eleven is the preferable number, as will hereinafter be explained) without creating a tens-transfer in the highest order, operates a mechanism which changes the sign character of the operation and, after the same number of cycles in the reverse direction, stops the machine. At that point the divisor has been added back the same number of times it was subtracted, which not only restores the dividend and quotient registers to their original value, but notifies the operator immediately that the factors are misaligned. In conventional machines the carriage can be shifted to the right until the factors are aligned. If they cannot be brought into alignment by this method, then the divisor can be shifted on the keyboard to the left so that the factors will be aligned. It sometimes happens that a divisor may be set in the highest orders of the keyboard and yet the factors cannot be aligned, for example, because the dividend has been accumulated through a series of operations that will place the highest order of the dividend in the overflow dial of the accumulator register one order to the left of the highest order of the keyboard when the carriage is in its extreme right-hand position. In such a situation the dividend can be shifted to the right by some suitable means, such as twirler knobs on the register dials, or by manually copying the dividend into the keyboard and then effecting a machine operation whereby the dividend is registered in the accumulator register. Occasionally it will be seen that the number of cycles to reach a true overdraft is not excessive, and if the quotient register also has an overflow dial, the quotient can be accurately shown by permitting the machine to run for a few more cycles to create a true overdraft. Thus in my preferred form of invention, a second operation of the division key will disable the automatic restore mechanism of my present invention, so that if a few more cycles will secure a true overdraft, it will readily be accomplished by my machine.

Thus in the preferred form of my invention, if the carriage has reached its extreme right-hand position and a tens-transfer has not occurred in the accumulator, or dividend register, by the eleventh machine cycle, the automatic dividend restore mechanism is operated. This mechanism controls operation of the machine for eleven positive, or additive, cycles, whereby the dividend will be restored (added back into the accumulator dials), and the accumulator will register its original value. At the same time, the quotient dials are likewise restored to their original value, i.e., zeroized in most instances. Also the machine will be brought to a stop after the dividend has been restored and, preferably, a mechanism will be operated to notify the operator that the divisor and dividend are so placed that normal division cannot take place. Therefore, it will be seen from the following description of the preferred embodiment of this invention that, in machines incorporating the present invention, it is no longer necessary for the operator to determine by inspection whether the factors can be properly aligned before depressing the division key.

It is again worthwhile to note that the preceding described dividend-divisor aligning mechanism is not absolutely necessary for the operation of the novel mechanism described hereinafter. It would be very convenient to incorporate the principle of the present invention into machines not provided with a true division aligner, thereby providing a mechanism which would count a first series of a plural number of registrations of one sign character and thereafter operate the division program means to count a second series of the same number of registrations of the other sign character, thereby restoring the dividend and quotient registers to their original value. At this point the machine is stopped and preferably an automatic signal is operated in order to inform the operator of incorrectly aligned factors.

(a) *Cycle Counting Mechanism*

In accordance with the preferred form of the present invention, means is provided for counting the number of machine cycles when the carriage occupies its extreme right-hand position. This means is operative after a predetermined number of subtractive machine cycles to control the operation of the division programming mechanism whereby the machine is thereafter operated for the same predetermined number of additive machine cycles, thereby restoring the dividend to its original value. It will be recalled that upon initiation of a division operation by the depression of the division key 41 (FIG. 1), the carriage shifting mechanism is operated in such a manner so as to cause the carriage 21 to shift to the right, in an attempt to align the highest digit of the dividend with the highest digit of the divisor. If the situation should arise that the carriage is shifted to its extreme right-hand position and the dividend and divisor are not aligned, and it requires more than eleven machine cycles to obtain a true overdraft, the present invention is operated to restore the dividend to its original condition.

This dividend restore means comprises a short transversely extending shaft, or rod, 501 (FIGS. 10 and 11) slidably journalled in an intermediate, or auxiliary, left side member 502 and a left side control plate 503, both of which are suitably secured to the base plate 62 by suitable means, such as the conventional fasteners 63. A collar 504 (FIG. 11) is pinned on the shaft 501 intermediate the length thereof, to provide a spring seat for a compression spring 506 which encircles the shaft 501 between the collar 504 and the left side of the intermediate frame plate 502. Therefore, as seen in FIG. 11, the spring 506 is effective to normally maintain the shaft 501 in its leftmost shiftable position. Secured to the right-hand end of the shaft 501 is a relatively large collar 507, the face of which engages a pin 508 secured to the left-hand end portion of the front rail 108 of the carriage shortly before the carriage reaches its right-hand position. Thus, it can be seen that when the carriage 21 is shifted to its terminal right-hand position, the pin 508 is effective to contact the collar 507 and shift the shaft 501 to the right, against the force of the spring 506. The movement of the shaft 501 becomes effective to initiate operation of mechanism for counting the ensuing machine cycles subsequent to the shifting of the carriage to its right terminal position, as will be described hereinafter. Secured on the left extremity of the shaft 501 is a sleeve 509 provided with an annular groove 511 which embraces a pin 512 secured on an upper offset end of a substantially vertical lever 513.

The offset lever 513 is pivotally mounted intermediate its length by means of a bolt 514 to a U-shaped bracket 516 secured to the control plate 503 by suitable fasteners, such as bolts 517. Secured on the lower end of the lever 513 is a pin 518 (FIGS. 9 and 10) which rides in an annular groove 519 (FIGS. 3 and 10) provided in the hub 521 of an idler gear 522 slidably and rotatably mounted on a large-headed machine screw 523 which is threaded into a suitable aperture provided in the control plate 503. This idler gear 522 consists of a complete set of narrow teeth enmeshing with a wide-faced drive gear 524 secured to the end of the main power shaft 81 adjacent the control plate 503 (see FIGS. 3, 9 and 10). The idler gear 522 has a single wide-faced tooth 526 which, in the home, or "0°" position of gear 522, lies directly behind the pin 518 when viewed from the left, as in FIG. 10. This wide-faced tooth is adapted to cooperate with a cyclic counting gear 527, to be described hereinafter. Upon shifting movement of the carriage 21 to its right-hand terminal position, as described above, the lever 513 will be rocked (clockwise as viewed in FIG. 11) by means of the pin 508 contacting the collar 507 in the manner described, so as to shift the shaft 501 to the right. Thereby the idler gear 522 will be shifted axially to the left on the shaft 523 to align the single wide-faced tooth 526 with the large, sixty-tooth cyclic counter gear 527, rotatably mounted on a screw stud 528 secured to an extension of the left side control plate 503. Hence, for each cycle of operation of the main power shaft 81, the wide-faced tooth 526 will rotate the cyclic counter gear 527, 12° or 1/30 of a revolution, whenever the carriage 21 occupies its right-hand terminal position. In all operations other than division (with the carriage in its right-hand position) the rotation of the counting gear 527 is ineffective, for the gear is resiliently restored immediately to its full-cycle, or home, position shown in FIG. 10. However in division operations a holding pawl is rendered effective to retain the gear in each adjusted position, so that the increments of rotation are accumulated and the gear assumes an angular position representative of the number of cycles of operation.

After the accumulator carriage 21 has reached its right end position, effecting operation of the idler gear 522, the cyclic counter gear 527 will be rotated 36° (three cycles) before it begins the actual counts required to effect a restoration of the dividend. These three cycles are incidental to the operation of the dividend-divisor aligning mechanism already described—conventionally being utilized to change operation from control of the aligner mechanism to the division mechanism. These first 36° of rotation of counter gear 527 are used to release the shifter arm assembly preparatory to the division operation. Thus, the counter gear 527 receives its first count of a plural number of a predetermined number of counts during the fourth machine cycle of operation subsequent to shifting of carriage 21 into its right terminal position. Following fourteen cycles of machine operation, i.e., eleven counting cycles following the three preliminary cycles just mentioned, the counter gear 527 is effective (due to means later described) to simulate an overdraft. Subsequent to the simulation of the overdraft the mechanism heretofore described is operated to move the small mutilated gear 297 (FIG. 8) into alignment with the large mutilated gear 298. Thus, the gear 297 will be rotated near the end of the fourteenth cycle of operation to move the add-subtract gate 88 from its subtraction position to its addition position, as described above. During the fifteenth cycle of machine operation, which, by the way, is the first additive cycle count of counter gear 527, means is effective to move the large mutilated gear 298 out of alignment with the extended gear 297 to disable further operation of the division programming mechanism. Hence, the cyclic counter gear 527 is operable after twenty-five cycles of machine operation (with carriage 21 in its rightmost end position) to effect a restore of the dividend, as will be described herein.

Referring briefly to FIG. 3, it can be seen that the gear 527 is spaced from the auxiliary frame member 503 by means of its hub 529 which is provided with an annular groove 531 having an elongated tension spring 532 riding therein. One end of the tension spring 532 is connected to a pin secured in the side walls of groove 531 and its other end is connected to a stud 533 (FIG. 10) secured on the control plate 503. Thus, the spring 532 provides the means for urging the gear 527 to its inactive position (clockwise in FIG. 10). A resilient bumper 534 is riveted to the inside face of the web of the gear and is adapted to abut the rearward face of one leg of U-shaped bracket 516, thereby providing a means for stopping the gear 527 in its inactive, or home, position against the urgency of spring 532. Hence, as the cyclic counter gear 527 is rotated one increment of two teeth (12°) during each machine cycle, the spring 532 will be progressively tensioned, and when the gear 527 is released from its holding means described in the next paragraph, the spring is operable to return the gear to its home position.

In order to retain the large cyclic counter gear 527 in its various rotated, or counting, positions during a division operation, there is provided a pair of holding pawls 536 and 543—one under the control of the idler gear positioning lever 513, and one under the control of the division mechanism. The first is operative only when the carriage is in its extreme right-hand position and the second only when the machine is operating in division. Both are necessary to the incremental positioning of the counter gear 527, so that it operates only when both conditions are presentd. The first holding pawl 536 is rockably mounted at its forward end on a screw 537 secured to the control plate 503. The pawl 536 extends rearwardly from the pivot 537 and has a ratchet pin 538 secured to the distal end thereof, which pin extends transversely therefrom into operable alignment with the teeth of the large gear 527. The pawl 536 is biased downwardly, i.e., into engagement with the teeth of gear 527, by means of a spring 539 connected between a stud 541 on pawl 536 and one of the bolts 517. The pawl 536 is normally maintained in its raised or inactive, position shown in FIG. 10 by an ear 542 formed integrally with the lever 513. The ear 542 extends substantially upwardly, and to the right, from the fulcrum of the lever to engage the lower edge of the pawl 536 and thereby maintains the pin 538 out of engagement with the teeth of the gear 527. Hence when the carriage 21 is in any position other than its terminal right-hand position, the lever 513 is rocked (to the counter-clockwise position shown in FIG. 11) by the compression spring 506 until it is stopped by means of the idler gear 522 abutting the frame member 503. Such rocking of lever 513 causes the ear 542 to raise the pawl 536 to its inactive position in which the pin 538 will lie above the gear 527. In order to prevent the gear 527 from being retained in a rotated position when the carriage is shifted to its terminal right-hand position during an operation other than a division operation, three teeth of the gear 527 adjacent the pin 528 have been removed, as clearly shown in FIG. 10. Actually, the pin 538 abuts the top of the first tooth of gear 527, and the gear can be fed about half a tooth space—but that is too little to have any effect on the mechanism.

Inasmuch as it is desired to retain the cyclic counter gear 527 in its first incremental rotation, or cyclic, position during a division operation, at a time when the holding pawl 536 is inoperable to retain the gear in its actuated position because of the removal of the teeth in the periphery thereof, there is provided a second ratchet pawl 543 rockably mounted at its lower end on the control plate 503 by means of a pivot screw 544. The upper end of the pawl 543 carries a pin 546 extending at right angles therefrom and operably aligned with the teeth of the large gear 527, so that upon rocking movement of the pawl the pin 546 is effective to engage the teeth of gear 527 to prevent return of the gear to its inoperable position. In order to effect the first incremental rotation, or cyclic counting, of the gear 527 during the first cycle of a division or aligning operation, during which cycle the pawl 536 is inoperative to retain the gear in a rotated position, the second pawl 543 is resiliently rocked (counter-clockwise in FIG. 9) each time the division key 41 is depressed. It will be recalled that each time the division key 41 is depressed, the shaft 313 is rocked. The rocking of this shaft is operable, through suitable linkage now to be described, to rock the pawl 543, whereby the pin 546 becomes effective to engage the teeth of the cyclic counter gear 527 and hold the gear in an actuated position. Secured to the shaft 313, adacent the outside of the left side frame 61, is a rearwardly extending arm 547 (FIGS. 7, 9 and 10) which carries a stud 548 extending into a slot provided in the free end of an arm 549 which is pinned on a short shaft 551 rockably journalled in the left side frame 61 and the control plate 503. Secured to the left end of the short shaft 551 is a downwardly extending arm 552 (FIG. 10), to which is pivotally connected at its lower end the rear end of a forwardly extending link 553. The forward end of this link 553 is provided with a slot 554 embracing a stud 556 carried by the pawl 543 intermediate the length thereof. The pawl 543 is spring-urged to a retracted position shown in FIG. 9 in which the pawl will follow the position of the link 553 by means of a tension spring 557 connected between the stud 556 on pawl 543 and a stud 558 carried by the link 553. Normally, however, the pawl 543 is prevented from engaging the gear because the normal position of shaft 313 holds the link 553 in its forward, or disabling, position shown. Therefore, it can be seen that when the parts are in the inactive position shown in FIG. 10, the ratchet pawl 543 is maintained out of ratcheting cooperation with the large gear 527 by means of the stud 556 abutting the end of the slot 554 in link 553. However, upon depression of the division key, the shaft 313 is rocked (counter-clockwise in FIG. 10) by the mechanism already described in the section headed "Automatic Division Mechanism." The rocking of shaft 313, through arms 547 and 549, rocks the short shaft 551 (clockwise in this figure), and that, in turn, causes rearward movement of the link 553. Thereupon the spring 557 will be tensioned to rock the pin 546 of pawl 543 into engagement with the teeth of the gear 527. Thus it will be noted from the foregoing description that upon initiation of a division operation, the ratchet pawl 543 is conditioned to provide a means for retaining the large cyclic counting gear 527 in its first actuated position, which is the one position in which the pawl 536 is ineffective because of the removal of the three teeth of the gear 527. It must be remembered, however that gear 527, in the preferred embodiment of my invention, can be operated only when the idler 522 is shifted axially on its shaft into mesh with counting gear 527—and that can occur only when the register carriage 21 is in its extreme right-hand position. Thus the counting gear 527 can be operated only when two conditions are present: the machine is operating in division, and the carriage is in its extreme right-hand position to shift idler 522 into alignment with gear 527. When both conditions exist, it will be seen that, at about the midpoint of each machine cycle, the wide tooth 526 will rotate gear 527 through an angle of 12° and that thereupon the ratchet pawls 536, 543 will prevent the counting gear 527 from returning to an inactive position—thereby providing a cyclic count of the machine cycles of operation.

(b) *Simulated Overdraft*

It will be recalled that upon initiation of the actual division operation, the divisor set in the keyboard is repeatedly subtracted from the dividend set in the dividend register. It can be seen from the above description that the large counter gear 527 is repeatedly stepped (counter-clockwise in FIG. 10) for each subtractive cycle of the machine, after the carriage 21 is in its right-hand end position. Hence the gear 527 provides a means for counting a series of subtractive machine cycles and can be operative after a predetermined number of such cycles to adust the machine in any desired manner. In the preferred form of my invention, I prefer to adust the machine so that it will repeatedly add the divisor back to the dividend an equal number of times in order to restore the dividend (and the quotient) to its original value. Thus, if the values in the machine had been so set that it would have taken an unreasonably long time before a true overdraft were obtained, then the original values, and particularly the dividend, are restored and machine operation terminated.

In order to restore the dividend after a predetermined number of subtractive machine cycles, the add-subtract gate 88 must be changed from the subtractive to the additive position thereof. A means is, therefore, provided in the present invention for simulating an overdraft after a predetermined number of cycles (I prefer eleven cycles), so as to cause operation of the division control flag 322 which, as pointed out hereinbefore, is instrumental in controlling the operation of the division program mechanism. It can be noted here that instead of limiting the program to the single additive corrective cycle conventional in such a mechanism, I modify the division programming mechanism in a manner to repeat the additive cycles for the same number of times that were used to simulate the overdraft, and then stop the machine.

For the purpose of operating a control mechanism after a predetermined number of cycles, a large conical pin 561 is secured to the web of the gear 527 substantially diametrically opposite a flat arm 562 (as shown in FIG. 10). The conical pin 561 is operable, after approximately 168° rotation of the gear 527, to rock the arm 562, rockably and nonslidably mounted on the left-hand end of a transversely extending shaft 563 slidably journalled in the right and left side frames 60 and 61, respectively. The arm 562 is normally biased downwardly by a light spring 564 (FIG. 10), preferably tensioned between this arm and the link 553, into contact with a pin 566 carried on the forward end of a forwardly extending arm 567 rigidly secured on the left extremity of the shaft 563. Thus upon rotation of the gear 527, the conical surface of pin 561 will first contact the upper face of the arm 562 to rock this arm downwardly. Upon downward rocking of arm 562, it will force arm 567 and shaft 563 to rock in the same direction to set up mechanism for simulating an ovedraft, as will be described hereinafter in this section. It should be noted here, however, that rotation of the shaft 563 is stopped, after a single machine cycle, by an arm 572 (FIG. 2) rigidly fastened to shaft 563 adjacent the inside of left frame 61 engaging a stop pin 565 on the frame plate. Then, upon further rotation of the gear during the subsequent machine cycle, the conical surface of pin 561 will continue to bear against the cam edge, and since the arm can no longer rock downwardly due to the stop pin 565, the shaft 563 will be axially moved to the left, as viewed from the front of the machine. The leftward movement of the shaft 563 will operate mechanism which will move the large mutilated gear 298 out of alignment with the small mutilated gear 297, as will be described hereinafter in the following section.

In order to prevent re-alignment of the large and small mutilated gears 297, 299 of the conventional programming mechanism, following leftward movement of the shaft 563 by the conical pin 561 subsequent to the predetermined series of subtractive machine cycles, there is provided a latch lever 577 (FIGS. 7, 9 and 10) secured to the left end of a short shaft 578 rockably journalled in the left side frame 61 and the control plate 503. The rear end of latch 577 is urged downwardly (counterclockwise in FIG. 10) into contact with the hub of the flat arm 562 by a relatively strong spring 579 (seen in FIGS. 7 and 9), having one of its ends connected to a stud 581 carried by the latch 577 and its other end connected to a stud 582 on the control plate 503. Hence, when the shaft 563 is moved to the left by the conical pin 561, the rear end of the latch lever 577 is rocked downwardly, by the urgency of the spring 579, until it is stopped by abutting shaft 563. Thereupon the rear end of the latch lever is positioned between the hub of arm 562 and the frame plate 503, thereby preventing the return of the shaft 563 to its normally inactive right-hand position until after the latch 577 has been removed from its blocking position, by means later described herein.

The shaft 563 is biased to its inactive position (counter-clockwise when viewed from the left side of the machine, as in FIG. 10) by a spring 568 (FIG. 7) connected between an arm 569 secured to the shaft and a stud 571 on the right side frame 60. The spring 568 is sufficiently stronger than the spring 564 to overcome the resistance thereof, since the spring 564 needs only be strong enough to maintain the undersurface of the flat arm 562 in contact with pin 566. In order to prevent the shaft 563 from rocking beyond its home, or inactive position (in its counter-clockwise direction in FIG. 10), there is provided a second stop pin 573 (FIG. 2) mounted on the frame plate 61, which is adapted to engage the arm 572 secured on the shaft 563. As the gear 527 is returned to its inactive, or home position, by spring 532, the conical pin 561 will contact the underside of arm 562 and will rock it upwardly, without rocking shaft 563, until the pin rides out from under the arm. Thereafter the arm will return to the position where it will once again lie upon pin 566 of arm 567.

The most convenient way to adjust the machine for a series of additive cycles is to simulate an overdraft of the division programming mechanism after the predetermined number of subtractive machine cycles. For this purpose I prefer a false, or simulating, overdraft arm 574 (FIGS. 2, 7 and 9) which is pinned on the shaft 563 in longitudinal alignment with the tail portion 429 of the flag 322. The arm extends forwardly from the shaft and carries a pin 576 on its free end that is positioned to overlie the tail 429 of the flag, which pin 576 is of sufficient length to allow axial movement of shaft 563 without disengaging the tail 429. Hence upon rocking of the shaft 563 (counter-clockwise in FIG. 2) the pin 576 of overdraft arm 574 will rock the tail 429 of flag 322 downwardly, so that upon the succeeding machine cycle the finger 324 of the flag will be engaged by the pin 326 to subsequently cause movement of the small mutilated gear 297 into alignment with the large mutilated gear 298. Thus as the machine continues to cycle, the add-subtract gate 88 will be moved from its subtractive position to the additive position thereof in the customary manner by the conventional division programming mechanism.

From the foregoing description it will be obvious that following a certain number of machine cycles, or incremental rotations, of the cyclic counter gear 527, the simulated overdraft arm 574 is operable to operate the overdraft detecting mechanism of the conventional division programming mechanism. It follows that upon operation of the overdraft detecting mechanism, the small mutilated gear 297 is moved to the right, as was pointed out above, into alignment with the large mutilated gear 298, so that in subsequent cycles of the machine the add-subtract control slide 141 (FIG. 5) will be shifted rearwardly to position the add gears 82 in mesh with the gears 86. It will be recalled that the small mutilated gear 297 is held in the outward (right-hand) position by means of the pin 308 engaging the inner face of the gear. It can again be mentioned that in the present invention the conventional drive for this mutilated gear is disabled, so that the gear will remain in its add position for a number of cycles equal to the preceding subtractive cycles. This purpose can be most readily accomplished by the means now to be described.

*(c) Inactivation of Division Programming Drive Gear*

In the conventional operation of the division programming mechanism, a shift cycle normally follows the single additive corrective cycle, as was described in the section entitled "Automatic Division Mechanism." In the present invention, however, during the dividend restore phase of machine operation the program mechanism must be disabled following movement of the gate 88 to its additive position. Consequently, the transverse shaft 563 has rockably mounted on its right-hand end a forwardly extending arm 583 (FIGS. 7, 8 and 9), the forward end of which rides in an annular groove 584 provided in the hub 301 of the axially movable idler gear 299. In order to maintain the idler gear 299 and the shaft 563 in the normal, inactive position shown in FIG. 7, i.e., in its unshifted position, there is provided a compression spring 587 wound about the shaft 563 and seated between the right side frame 60 and the face of the hub of arm 583. A collar 585 on the right end of shaft 563 holds the arm 583 on the shaft, the spring 587 forcing the arm against the collar so that leftward shifting of the shaft also shifts the arm 583 to the left. Therefore, it can be seen that operation of the simulated overdraft lever 574 occurs in the cycle in which the conical pin rocks the arm 562 and is followed, in the same cycle, by the operation of the flag 322. At the end of that cycle the engagement of pin 326 on disk 327 forces the flag 322 and shaft 274 to the right, which is operable to move the small mutilated gear 297 into the plane of the mutilated idler 298, whereupon the mutilated program gear 297 will be rotated one-third of a revolution in the manner described earlier. This rocking of the mutilated program gear shifts the gate 88 and the add and subtract gears 83 and 84, respectively, from the subtractive to the additive position thereof. In the succeeding machine cycle, and before the large mutilated gear 298 can again rotate the small mutilated gear 297 another one-third of a revolution, or to its shift position, the conical pin 561 will shift the transverse shaft 563 to the left, whereby the large mutilated gear 298 will be moved to the left, out of alignment with the projected mutilated gear 297. Thus, upon continuous operation of the machine after movement of the add gears 83 into mesh with the accumulator gears 86, the dividend will be restored, i.e., the divisor will be added back into the dividend register dials 22, and the division program mechanism disabled before the mutilated program gear can be rocked to its shift position. Following a predetermined number of additive machine cycles, the latch lever 577 releases the shaft 563 to the urgency of spring 587, whereby the shaft is returned to its rightmost, inactive position. Such movement of the shaft 563 to its normal, right-hand position, shifts the mutilated idler 298 to its normal position and the two mutilated gears are once again in alignment. In the subsequent cycle, the gate 88 is moved to its neutral position and the main clutch is opened to terminate operation of the machine.

*(d) Stop Mechanism*

The preferred embodiment of the present invention includes the conventional division stop mechanism described above. In my invention, however, it is desirable to temporarily disable this mechanism during a division operation whenever the carriage is shifted to its terminal right-hand position in order to prevent termination of a machine operation, and consequently the loss of the dividend and an error of the quotient which would result from such a premature stopping. In order to accomplish this purpose, the preferred embodiment of the present invention is provided with a two-armed control lever 601 (FIGS. 4, 8 and 11), rockably mounted by means of a short pivot screw 602 on the right-hand side of the right side frame 60. The rearwardly extending arm of lever 601 is formed into a laterally inclined cam 603 which abuts the underside of the front carriage rail 108 of the carriage 21. Because the forwardly extending arm of lever 601 is considerably longer than the rearwardly extending arm provided with the inclined cam 603, and consequently is much heavier than the rear end, the lever is rocked by gravity (counter-clockwise in FIG. 4) so as to cause the inclined cam 603 to cooperate with a notch 604 (FIGS. 1 and 11) provided in the lower flange of the channel which forms the carriage rail 108. In my preferred embodiment, this notch lies between the "7" and "8" ordinal tabulator keys 55, and hence is aligned with the right frame plate 60 whenever the carriage 21 is shifted to its rightmost terminal position. Upon downward rocking of the forwardly extending arm of lever 601, as described above, a notch 606 (FIG. 4) cut in the lower forward edge thereof will engage the pin 404 extending inwardly from the division stop lever 393, thereby latching the division stop key 43 against rearward movement and thus disabling the conventional division stop mechanism so long as the carriage is in this extreme position.

Also, it can be seen that when the carriage is shifted to the left, the edge of the notch 604 will contact the inclined cam 603 to rock the lever 601 (clockwise in FIGS. 4 and 8) to return it to its normal, inactive position in which the notch 606 is removed from the pin 404 and the stop lever 393 again can be operated in a normal manner.

However, it will be recalled that in my invention I stop the machine as soon as the proper number of additive, or restorative, cycles have returned the dividend to its original value. This is most readily accomplished by automatically operating the division stop mechanism to immediately stop the machine at the proper time. Thus, while I block operation of the division stop key 43, I operate the division stop mechanism as soon as the dividend is restored. For this purpose the latch lever 601 is provided with a laterally projecting stud 607 (FIGS. 4 and 11) extending into alignment with a finger 608 secured on a stop shaft 594 adjacent the right side frame 60. Hence upon counterclockwise rocking of the shaft 594 (FIG. 4), by mechanism described hereinafter, following the predetermined number of additive machine cycles necessary to restore the dividend, the finger 608 will rock the lever 601 clockwise to its inactive position, thereby removing the notch 606 from its engagement with the pin 404. The division stop key will thus be released, so that the conventional stop mechanism can be operated.

The rocking of the stop shaft 594 is also operative to release the division latch 281 (FIG. 4) simultaneously with the disabling of latch lever 601. It is seen in FIG. 5 that the shaft 594 carries a downwardly extending arm 609 which is secured thereon adjacent the left-hand side of the control plate 136. The forward end of a division stop actuating link 611 is pivotally connected to the lower end of arm 609 by means of a stud 612. The rocking of the shaft 594 (clockwise in FIG. 5), by a mechanism to be described under the heading "Operator's Information Sign Mechanism" below, following completion of the dividend restore operation of the machine, rocks arm 609 rearwardly. Such rocking of the arm moves the actuating link 611 rearwardly into engagement with a pin 613 (see FIG. 4) extending to the right from a division stop plate 614 pivotally mounted on conventional division latch lever stud 282. Thus rearward movement of the link 611, and the engagement of the link with pin 613, rocks the division stop plate 614 (counter-clockwise in FIG. 4). The division latch lever 281 will then be rocked (counter-clockwise in this figure) by a stud 616 secured to the left side of the plate 614, which stud engages the forward edge of the latch lever. Such rocking of latch lever 281 causes the hook portion on the lower end thereof to release the half-round stud 279 (FIG. 5) on the division control lever 267, which lever 267 will thereupon release the add-subtract slide 141 so that it can return to its normal inactive position, and bellcrank 284 will no longer maintain engagement of the clutch. It can be noted in passing that in the preferred form of my invention I do not stop the machine at this point but continue operation for two additional machine cycles, which are required to return the programming mechanism to its normal inactive condition (to be described in the next section). However, during these two cycles the add-subtract gate 88 is in its neutral position and the dividend dials will, therefore, not be disturbed.

Preferably I provide a means for removing the lever 611 from engagement with the pin 613 of the stop plate 614, so that the latch lever 281 will be released to return to its normal position in readiness for another division operation with the carriage still in its right terminal position, for at this point the shaft 594 has not been returned to its inactive position. This means comprises a cam follower 617 (see FIGS. 5 and 8) pivotally mounted on the control plate 136 by a suitable fastener, such as a screw 618. The rearwardly extending arm of the cam follower 617 is provided with a roller 619 and an upstanding nose 621. The roller 619 is maintained in contact with the periphery of a short rise plate cam 622 carried by the main power shaft 81 adjacent the inside web of the drive gear 258, by means of a spring 623 connected between a pin 624 secured on the forwardly extended arm of the follower 617 and a pin (not shown) riveted to the control plate 136 (behind the link 353 in FIG. 8). Thus, during the machine cycle subsequent to the cycle in which the division latch lever 281 is rocked to unlatch the division control lever 267 by the rearward movement of the actuating link 611, the node of the cam 622 will rock the follower 617 (counter-clockwise in FIG. 8), whereupon the nose 621 will contact a pin 626 secured on the link 611, which pin normally lies in front of the nose but has been moved into alignment with the nose 621 upon the rearward movement of the link. Such rocking of the follower 617 raises the distal end of link 611, due to nose 621 forcing pin 626 upwardly, to remove the end of the link from engagement with the pin 613, thereby allowing the latch to return to its normal position. Therefore, the latch lever 281 is returned to its normal position by the spring 283, so as to be in readiness for another operation if the next machine operation should be an automatic division operation.

*(e) Additional Cycle Mechanism*

In order to ensure the return of the division programming mechanism to its inactive condition following the additive machine cycles for restoring the dividend, where once again the notch in the small mutilated gear 297 (FIG. 8) can drop over the pin 308 on the control plate 136, I provide means for keeping the main drive clutch open for two additional cycles of operation following release of the division control lever 267 and its associated mechanism. Two such cycles are necessary, as the last add cycle and the consequent restoration of the mutilated idler 298 to its normal plane, will start to rotate the mutilated control gear to its shift position, so that the first such subsequent cycle is an idler shift cycle, which normally ends before the mutilated gear can return to its full-cycle position. To accomplish this purpose, the machine described herein is provided with a clutch-controlling bellcrank 627 (FIGS. 8 and 9) having the two arms thereof integrally connected together by a collar 628. The lower end of the downwardly extending arm of the bellcrank is provided with an inclined cam face 629 which is in axial alignment with the hub of the small mutilated gear 297; and the upwardly extending arm is pivotally connected at 631 to the rear end of a forwardly extending link 632, the purpose of which will be described later herein. The collar 628 of the bellcrank 627 is pivotally mounted on the control plate 136 by a screw 633 passing freely through the collar 628, the arms of the bellcrank being held in their proper planes by means of a small spacing sleeve 634 which encircles the shank of the screw between the control plate and the bellcrank. In the normal inactive position of the bellcrank 627, as shown in FIG. 8, the face of the inclined cam 629 lies in transverse alignment with the hub of the smal mutilated gear 297, so that upon movement of the gear 297 to the right at the start of the division program, the hub thereof will engage the inclined cam and force the bellcrank 627 to rock (clockwise in FIG. 8). Upon rocking of the bellcrank 627 the link 632 is moved rearwardly to open the main drive clutch.

The forward end of link 632 is pivotally connected to a collar 636 (FIG. 5) by means of a screw 637 secured in a suitable threaded aperture provided in the end of the collar 636. The collar 636 is connected to a reduced end portion of an ear 638 formed integrally with the conventional clutch control link 127 (FIG. 4) and extending at right angles thereto. Thus it can be seen that for the next two subsequent machine cycles (i.e., so long as the mutilated gear is in its projected axial position), the link 632 will be cammed rearwardly, thereby maintaining the main clutch open for the additional machine cycles necessary to return the small mutilated gear 297 to its home position. When the mutilated control gear has returned to its home, or retracted, position, it releases the bellcrank 627 so that it can return to its inactive position and thereby release the clutch control slide 151 and clutch pawl 122 (FIG. 4), which will subsequently bring the machine to a stop at the end of that cycle.

(f) Operator's Information Sign Mechanism

It is desirable in a machine employing the present invention, but not essential to the operation thereof, to provide a means for informing the operator that the divisor is not alignable with the dividend by a normal division operation of the machine. It has already been mentioned that substantially simultaneously with the operation of the simulated overdraft mechanism during the eleventh cycle of subtractive operation, the latch mechanism 577 (FIG. 10) is operated to latch the transverse shaft in its left-hand shifted position so as to hold the division programming mechanism in additive correcting operation for an equal number of cycles. Subsequent to the predetermined number of additive machine cycles, a means becomes effective, by operation of the large counting gear following restoration of the dividend, to inform the operator that the highest digit of the dividend cannot be aligned with the highest digit of the divisor. One of the simplest, and, therefore, most desirable, forms of such an indicating device is a sign drum 598 (FIG. 11), which preferably is mounted on the left-hand portion of the transverse shaft 594 adjacent the left side frame 61. Preferably this sign drum 598 has the words "Align Divisor" inscribed thereon, in an angular position which is viewed through a window 599 (FIG. 1) provided in the cover of the machine when the stop shaft 594 is rocked, as will be described below. Therefore, it can be seen that during a division operation in which the carriage 21 is shifted to its right-hand terminal position and the divisor is repeatedly subtracted from the dividend for eleven consecutive cycles, the rocking of shaft 594 to disable the division stop mechanism and to enable the auxiliary stopping mechanism for operation after the eleven additive cycles, is also effective to rock the drum 598 a sufficient angular distance to align the words "Align Divisor," or similar indicia, with the viewing window 599. Thus the operator will be informed that a true quotient cannot be obtained within a reasonable time of machine operation.

The means for rocking the shaft 594 will now be described, with reference to FIGS. 3, 7, 9, 10 and 11. It will be seen that the means for rocking shaft 594 comprises a downwardly extending arm 588 pinned to the shaft 578 adjacent the latch lever 577 (FIGS. 3, 9 and 10). At its lower end the arm 588 is pivotally connected to a long link 589, as by a pin 591, the link extending upwardly and forwardly therefrom. The link 589 is connected at its forward end to a short arm 592 (FIGS. 10 and 11) by a pivot pin 593. The arm 592 is secured on the stop shaft 594 mentioned earlier, which shaft, incidentally, is rockably journalled in the left side control plate 503 and the right side control plate 136. It will be seen that the operation of latch arms 577 to latch shaft 563 in its left-hand position, slightly rocks shaft 594 (counter-clockwise in FIG. 10 and clockwise in FIG. 4). This, it will be recalled, withdraws arm 608 (FIG. 4) from blocking latch 601, so this latch 601 is then able to lock the division stop lever 43 against operation, while the auxiliary stop mechanism is conditioned for operation. Following the operation of the machine for the predetermined number of additive machine cycles, in which case the large counting gear 527 will have been rotated approximately 300°, or eleven additive counts, a stud 596 riveted to the inner side of the gear 527 will have contacted a large right angle ear 597 formed on the forward end of the latch lever 577. The latch lever 577, which previously had been rocked counter-clockwise into latching relationship with the shaft 563, will thereby be rocked clockwise, during the eleventh additive count of the gear 527, beyond its normal inactive position to release the lever 567 and allow the shaft 563 to be returned to its inactive position by means of the compression spring 587. Also during movement of the latch lever 577 beyond its normal unlatched position, i.e., to an overthrow position, the arm 588 depending therefrom will likewise be rocked (clockwise in FIG. 10), thereby moving the link rearwardly so as to cause clockwise movement of the stop shaft 594. Such return rocking of the shaft 594 rotates the drum 598 to its indicating position, releases the division stop block, and operates the auxiliary stopping mechanism.

It will be observed from reference to FIG. 10 that during the cyclic operation of the counter gear 527 following the last additive count, the space in the periphery of the gear provided by the removal of three teeth will have been rotated to a point where it is in registration with the idler gear 522. Thus, it follows that if the machine were again operated with the carriage 21 in its right terminal position, the pawl 536 would prevent the gear 527 from returning to its inactive position. On the other hand, gear 527 would not be rotated any further since the wide-faced tooth of gear 522 would idly rotate in the space provided in the periphery of gear 527. Conversely, upon shift of carriage 21 to the left, pin 508 on the carriage rail 108 will be removed from engagement with collar 507, thereby allowing the lever 513 to be rocked (clockwise in FIGS. 9 and 11) under the influence of the compression spring 506. The return of lever 513 to its inactive position by the action of spring 506 will not only shift the idler gear 522 out of alignment with gear 527, but also, due to the engagement of the ear 542 with the undersurface of pawl 536, will raise the pawl against the pull of the light spring 539 out of ratcheting cooperation with count gear 527. The count gear 527 is thereby allowed to return to its inactive position due to the urgency of spring 532, in which event the resilient bumper 534 will rest against the leg of the U-shaped bracket 516. It will be noted that during return of gear 527 to its inactive position, the conical pin 561 will contact the underside of the freely rockable lever 562, rocking it upwardly until it slides off the pin and returns to a position in which it will lie upon the stud 566 without causing any movement to the shaft 563. Once again it will be recalled that upon termination of a division operation, the shaft 313 is returned to its normal inactive position, whereby the second pawl 543 is rocked to an inactive position so that the pin 546 in the free end thereof is removed from association with the teeth of the counter gear 527. Therefore, it can be seen that if a true overdraft is obtainable before the eleventh subtractive cyclic counter of gear 527, i.e., the fourteenth machine cycle after the carriage 21 has reached its right-hand end position, the carriage 21 will be shifted to the left, removing pawl 536 and gear 522 from cooperation with the counter gear. Then, later, upon termination of the division operation, the second pawl 543 is moved out of the relationship with gear 527, so that the cyclic counter gear 527 is allowed to return to its inactive position without effecting a continuous additive operation of the machine.

However, if the division factors are not aligned, and the dividend is restored as herein explained, the second depression of the division key 41 will initiate a second division operation. During this second operation, the machine will cycle indefinitely because the idler 522 cannot rotate the counter gear 527, for at this point the blank space on the periphery of gear 527 is opposed to the idler 522. This enables the operator to ignore the dividend restoring mechanism in the event it will not take an unreasonably long time to reach a true overdraft.

(g) *Selective Operation Control Lever*

Sometimes it is desirable to modify the present invention by the introduction of a disabling means operable to disable the dividend restore mechanism heretofore described. In one of its forms this disabling means may consist of a handle 641 (FIGS. 1, 10 and 11) protruding through a slotted aperture 642 in the top of the machine cover adjacent the left side of the machine. The handle 641 is secured on the upper end of an upstanding arm 643 of a bellcrank 644, pivotally connected at its elbow to the auxiliary member 503 by a screw 646. The other arm 647 of the bellcrank 644 extends rearwardly from the pivot 646 and has its distal end formed into a hook 648 operable upon rocking (clockwise in FIG. 10) of the bellcrank 644 to engage the ratchet pin 546 of ratchet pawl 543. Normally, depression of the division key 41, through the mechanism described, including the rocking of the shaft 313 and the translation of the link 533 rearwardly, pulls the pawl 543 into cooperation with the large count gear 527. However, if the bellcrank 644 has been rocked forwardly to its disabling position (clockwise from that shown in FIG. 10), the hook 648 will prevent the ratchet pin 546 from moving into ratcheting association with gear 527. In that event, the spring 557 will yield, so that the link 553 can still move rearwardly so as not to interfere with operation of the division mechanism. Therefore, upon continuous cycling of the machine, during a division operation, the large counting gear 527 will receive a partial rotation each time the wide-faced tooth 526 of gear 522 rotates into engagement with the teeth of gear 527 but will be repeatedly returned by the spring 532 to its inactive position, since the lower ratchet pawl 543 has been disabled and the upper holding pawl 536 is engaging the blank space provided by the elimination of the three teeth on gear 527. The selectively operable control lever 644 is resiliently maintained in either its operative position, i.e., automatic restore or in its inoperative, or restore disabling, position by means of a detent arm 649. The detent 649 is pivotally mounted at its forward end on the left side control plate 503 by a screw 651, while the lower edge thereof is provided with a substantially M-shaped notch 652 which engages a stud 653 secured to the upstanding arm 643 of bellcrank 644 in either of the two positions thereof. Hence, it can be seen that when the selective control lever 644 is rocked to its automatic restore position, the pin 653 will be positioned in the apex of the rearward leg of the M-shaped notch 652, retaining the lever in its disengaged position until it is manually moved forwardly to its restore disabling position, at which time the pin 653 will be positioned in the apex of the forward leg of the M-shaped notch, retaining the lever in this position until it is manually moved therefrom. The detent is resiliently urged downwardly by means of a spring 654 connected between a spring seat 656 in the arm 649 and a stud 657 on the auxiliary member 503 to ensure positive positioning of the lever 644 in either of its two positions.

Therefore, it can be seen from the above-described mechanism that a means is conveniently provided for disabling operation of the novel dividend restoring mechanism if the operator should observe, prior to commencement of the division operation, that a true overdraft can occur in the dividend dials within relatively few machine cycles even though the divisor is not alignable with the dividend.

III. OPERATION

When a dividend which is standing in the accumulator (dividend register) dials 22 is to be divided by a divisor set in the value keys 29, the operator merely depresses the division key 41 to initiate automatic operation of the machine. In the machine with which my invention is preferably associated, it will shift the register carriage to the left to bring the highest significant digits of the dividend and divisor into alignment, after which the machine will proceed to carry out a normal automatic division operation (assuming that the factors have been set into the machine in the proper manner).

However, if the factors have been set into the machine with the highest order of the dividend too far to the left to be aligned with the divisor, the carriage will be shifted to its extreme right-hand position and the above-described automatic dividend restore mechanism of the present invention will become effective. This mechanism will, after ten or more subtractive cycles have failed to produce an overdraft, automatically reverse operation for the same number of cycles and thus reinstate the dividend factor to its original condition in the dividend dials and also to zeroize the quotient dials 24, after which the machine operation will be terminated by operation of the division stop mechanism. Preferably, an informing sign is then displayed to inform the operator that he must align the divisor before a normal division operation can take place.

In order to briefly review the above sequence of operations, assume that the highest digit of the dividend factor is placed in the highest ordinal dividend dial (which, in most machines is an "overflow" dial and cannot be aligned with the keyboard), and the highest digit of the divisor is placed in the highest ordinal row of the value keys. Upon depression of the division key 41, the shaft 337 (FIG. 6) will be shifted to the left by the upward movement of stud 311 secured on the control lever 267. Inasmuch as the latches 413 and 414 are engaged with the shifter arm assembly at this time, the sleeve 411 will likewise be shifted to the left, so as to condition the machine for a right shift operation each time the shift shaft 337 is rocked by the cam 332. At the same time, the slide 421 will be shifted to the left so as to depress the tail 429 of the flag 322, thereby rendering the program control mechanism effective to produce the sequence of subtract (with simulated overdraft), add, and shift cycles of the machine. During the following continuous and uninterrupted cycling of the machine, carriage 21 will continue to shift toward the right until it reaches its rightmost terminal position. At this point the "0" sensing finger 447 (FIG. 2) moves rearwardly into the space provided by the shortened head of the sensing slide 448 coordinally related to the highest outboard order dial 22 to signify the last, or highest, order in the dividend register, whereupon the short latch 414 will be disabled, or unlatched, to permit the shift arm assembly to escape slightly to the right until caught by the long latch 413. This will occur at the beginning of the shift cycle of the machine in which the carriage is shifted in its right terminal position due to the control exercised by the flat-sided cam 329 over the sensing finger 447. In the example stated above, a true overdraft cannot occur with the carriage in the extreme right-hand position, but this situation is overcome by the operation of the simulated overdraft mechanism which is operated near the end of the subsequent idle shift cycle of machine operation by the rocking of the override pawl 229 (FIG. 7). The rocking of the override pawl rocks lever 462 (FIG. 6), and the shifter arm assembly will thereby be released by operation of the long latch 413 so as to set the machine for a normal division (subtraction) operation.

When the carriage 21 is shifted to its right-hand terminal position, the wide-faced tooth 526 of gear 522 (FIG. 10) is moved into alignment with the large sixty-tooth counting gear 527 of the dividend restore mechanism, whereby the counter gear 527 is rotated 12° for each cyclic operation of the main power shaft 81. Upon movement of the carriage to its rightmost end position, the count gear 527 will be rotated 36° during the three machine cycles required to release the shifter arm assembly preparatory to the division (subtract) operation. Therefore, it can be seen that gear 527 begins its first actual pertinent count during the fourth machine cycle of operation after the carriage reaches its right end position. After 168° of rotation of the count gear (fourteen cycles, or counts, including the three idle cycles above-mentioned), the conical pin 561 becomes effective to rock the shaft 563, which simulates an overdraft because the tail 429 of flag 322 is rocked by the simulated overdraft arm 574. Near the end of the then current, or fourteenth, machine cycle (approximately after 315° rotation of main shaft 81) the small mutilated gear 297 is moved into alignment with the large mutilated gear 298 whereupon it will be rotated one-third of a revolution, starting just prior to the termination of this same machine cycle. Inasmuch as the mutilated gear 297 is operable to control operation of the add-subtract gate 88, the gate 88 will thereby be reversed, i.e., moved from the subtraction to the addition position thereof, so that upon the ensuing, or fifteenth, cycle of machine operation, the divisor will be added back to the dividend dials 22. During the next 12° rotation of the count gear 527 (i.e., the first additive count, or the fifteenth cycle of the machine) subsequent to the movement of the small mutilated gear 297 to the right, the conical pin 561 will impose an axial leftward movement to the transverse shaft 563, which movement is effective to shift the large mutilated idler gear 298 to the left, out of alignment with the extended small gear 297, in order to disable operation of the programming mechanism and thereby prevent movement of the gate 88 to its neutral position.

It will be recalled that the shaft 563 is latched in its left-hand shifted position by the latch lever 577, which latch lever is also effective to control operation of the stop mechanism and the operator's information sign drum 598. Following the predetermined number of additive counts of the count gear 527, the stud 596 secured thereon becomes effective after 300° of rotation of gear 527, i.e., at the beginning of the last additive, or twenty-fifth, count of the gear, to rock the latch lever 577 (clockwise in FIG. 10), thereby releasing the shaft 563 so that it can return to its normal rightmost position. The clockwise movement of the latch lever 577 is instrumental in overrocking the sign-stop shaft 594, which is effective through the action of arm 609 and lever 611 (FIGS. 5 and 8), abutting pin 613 (FIG. 4), to rock the stop plate 614. The rocking of the stop plate controls the operation of the division latch lever 281 so that the hook portion thereof will be removed from the half-round stud 279 (FIG. 5), which releases the division control lever 267 so that it can be returned to its normal inactive position. Upon release of the control lever 267, slot 267 is removed from stud 277 on the add-subtract control slide 142, whereupon the gate shaft 91, connected to the control link 141 by arm 143 and stud 144, is rocked to its central, inactive position. Inasmuch as the shaft 91 controls operation of the gate 88, it will also be rocked to its central, or neutral, position, thereby freeing the accumulator gear 86 from either gear 83 or 84.

Following release of the division control lever 267, the clutch and motor control slide 151 (FIG. 5) will be returned to its inactive position to terminate operation of the machine. However, during the dividend restore operation the link 127 (FIG. 4) is kept in active position thereof for two additional machine cycles, subsequent to operation of the division stop mechanism, by means of bellcrank 627 (FIG. 8), link 632, and ear 638. It will be recalled that upon operation of the division stop mechanism, the mutilated gear 297 is positioned in its projected add-back condition, in which projected position the hub of the gear 297 is effective to rock the bellcrank 627 (clockwise in FIG. 8). Therefore, the machine will receive two additional cycles of operation to return the mutilated control gear 297 to its home position in which its notch registers with pin 308 (FIG. 7) and it may be retracted to its original position adjacent the control plate 136. The hub of gear 297 then releases the cam on the bellcrank 627, and it is allowed to return to its inactive position, thereby disengaging the clutch and opening the motor circuit to terminate operation of the machine.

Once again it is worthwhile noting that upon restoration of the dividend, the sign drum 598, having the words "Align Divisor" inscribed thereon, will be rotated, so that this information comes into view through the window 599. Thus the operator will be informed that the highest significant figure of the dividend cannot be aligned with the highest significant figure of the divisor by normal operation of the conventional dividend-aligner mechanism. It is held in this position by the gear 527 remaining in its adjusted position, as above-described, so that its pin 596 holds the latch 577 in its overrocked position in which the sign is visible.

If, after termination of a dividend restore operation, the operator should observe that a true overdraft would occur in the dividend within relatively few machine cycles, for example, in twelve or fifteen cycles, he may depress the division key 41 a second time, without previously aligning the dividend and divisor, which second depression of the division key will initiate a normal division operation. Since the count gear 527 (FIG. 10) is prevented from returning to its home position as long as the carriage remains in its rightmost terminal position and ratchet pawl 536 remains effective, the gear 527 is ineffective during a second division operation to control a positioning of the gate 88 or the shifting of the mutilated idler (FIG. 8). The gear 527 is ineffective because it has been rotated to a position in which the blank space, provided by the three removed teeth in the periphery thereof, is aligned with the rotating wide-faced tooth 526 of gear 522. Thus the count gear cannot be rotated during the second division operation and it is, therefore, ineffective to initiate a simulated overdraft, so that the second division operation can proceed without interruption.

As herein mentioned, it is within the scope of the present invention to incorporate it within a machine not employing a true dividend-divisor aligner mechanism. In machines not employing mechanisms for automatically shifting the carriage to the right preparatory to an actual division operation, the above-described novel mechanism could be effectively operated upon initiation of a division operation to restore the dividend. For example, if the idler gear 522 were located permanently in the plane of the large cyclic counter gear 527, the ensuing subtraction cycles of a machine operation would be counted for a first series of a plural number of cycles. Then, if a true overdraft had not occurred by a certain cycle, the machine would then be operated for a second series of a plural number of additive machine cycles to add back the subtracted dividend, thereby restoring the dividend to its original value. The operation of the machine would thereafter be terminated and the operator would be informed to the effect that he had to align the divisior with the dividend in order to procure a quotient within a reasonable time of machine operation. This type of mechanism would not be dependent upon a carriage shifting operation as in the preferred form described, but a direct result of the depression of the division initiating key. In this case it would only be necessary to dispense with the upper holding pawl 536 and the parts associated with pin 508. It would then be desirable to relocate the lower holding pawl 543 so as to be effective at a point above the idler gear 522. It would also be necessary to provide a means for disabling the pawl 543 each time a true overdraft occurred during a division operation. In all machine operations other than a division operation, the wide-faced tooth of idler gear 522 would idly rock the count gear 527 for each cycle of the machine, after which the count gear would be returned each time to its inactive position by spring 532. Upon initiation of a division operation, the pawl 543 prevents the return of gear 527, and following a series of a plural number of subtractive machine cycles in which a true overdraft had not occurred, one would be simulated. Thereafter the machine would operate for a series of a plural number of additive machine cycles to restore the dividend, and then stop. On the other hand, if a true overdraft should occur prior to a simulated one, means would be operated by the operation of the true overdraft mechanism to temporarily disable operation of the lower holding pawl 543 until termination of machine operation.

Certain machines now manufactured are provided with division line-up mechanisms (other than the type disclosed in Patent No. 2,653,765, above), e.g., such as those disclosed in Patent No. 2,636,677, issued to Herman Gang on April 28, 1953 and Patent No. 2,710,141, issued to H. T. Avery on June 7, 1955. Such machines usually have a "line-up" key which can be depressed simultaneously with a division key and is then operable to produce a carriage shift operation to a predetermined right-hand position prior to the actual division operation. One aspect of my invention would be to provide suitable means to operate the above-described dividend restore mechanism upon shift of the carriage to its predetermined right-hand position. For instance, a device operated by the tabulating responding mechanism of the "line-up" key type machine would operate the present dividend restore mechanism following commencement of the actual division program. Here again the machine would operate for a predetermined number of subtractive machine cycles in the first series of such operations and then initiate a series of an equal number of additive machine cycles to restore the dividend, if a true overdraft had not occurred or the carriage had not been shifted by the predetermined subtractive machine cycles. Conversely, when the tabulating mechanism is operated during other machine operations, e.g., multiplication operation, etc., the holding pawl 543 would be disabled due to lack of operation of the division key and it would be ineffective to ratchet the large gear 527, even though the wide-faced tooth is enmeshed with gear 527.

While I have described the salient features of my invention in detail with respect to my preferred embodiment, it is obvious that it may be embodied in other specific forms without departing from the spirit or essential characteristics thereof. The present embodiment is to be considered in all respects as illustrative and not restrictive, inasmuch as the dividend-divisor aligning mechanism disclosed herein is not essential to the operation thereof. However, since this mechanism is the more difficult one to incorporate with the present invention, it is deemed advisable to disclose it herein. It, therefore, will be appreciated by those skilled in the art that numerous modifications and variations thereof are possible within the scope of the invention and thus the invention is not to be limited except by the terms of the following claims.

What is claimed is:

1. In a calculating machine adapted to perform division operations having an ordinally arranged selection mechanism settable to represent the various digits of a divisor, a shiftable register containing a plurality of ordinally arranged register dials settable to represent the various digits of a dividend, power-operated shifting means for laterally moving the said register in either direction relative to said selection mechanism, a cyclically operable actuating means for entering a value set in said selection mechanism into said dividend register, a sign character control means adjustable to control additive or subtractive registrations in said register, an automatic division control mechanism effective to control operation of said actuating means and said shifting means to divide a dividend set in said register by a divisor set in said selection mechanism and including overdraft sensing means operative to terminate operation of said actuating means in any particular ordinal position of said register and to shift said carriage to the left, and a manually operable control means for initiating operation of the said automatic division mechanism, a dividend restore mechanism for causing the restoration of the dividend into said register upon initiation of said division mechanism in the event the highest significant digit of the divisor in the selection mechanism is aligned with a lower order digit of the dividend in the register when division is initiated comprising the combination of a cycle counting means operable to count the first ordinal series of operations controlled by the division control mechanism, means operated by the said overdraft sensing means for disabling said counting means, and means operated by said counting means upon counting a predetermined number of cycles of operation of said actuating means to operate the said sign character control means to reverse the sign character of operation and for holding said sign character control means in such reversed sign character condition for a like predetermined number of cycles and then terminating machine operation.

2. In a calculating machine adapted to perform division operations having an ordinally arranged selection mechanism settable to represent the various digits of a divisor, a shiftable register containing a plurality of ordinally arranged register dials settable to represent the various digits of a dividend, power-operated shifting means for laterally moving the said register in either direction relative to said selection mechanism, a cyclically operable actuating means operable to enter a value set in said selection mechanism into said dividend register, a sign character control means adjustable to control an additive or subtractive registration in said register upon operation of said actuating means, an overdraft sensing means, an automatic division control mechanism operated by said overdraft sensing means to control adjustment of said sign character control means and operation of said actuating means and said shifting means to divide a dividend set in said register by a divisor set in said selection mechanism, and a manually operable division key for conditioning said overdraft sensing means for operation and initiating a series of continuous subtractions; a dividend restore mechanism for causing the restoration of the dividend into said register upon initiation of said division mechanism in the event the highest order of the divisor is to the right of the highest order of the dividend upon the initiation of a division operation comprising the combination of a cycle counting means conditioned for operation by said division key and operable to count the number of cycles of operation of said actuating means, means operated by said overdraft sensing means for disabling said counting means, means operated by said counting means upon counting a predetermined number of subtraction cycles of said actuating means to operate the sign character control means to initiate a series of continuous addition cycles, and means operated by said counting means upon counting a like predetermined number of addition cycles of said actuating means to terminate operation of said machine.

3. In a calculating machine adapted to perform division operations having an ordinally arranged selection mechanism settable to represent the various digits of a divisor, a shiftable register containing a plurality of ordinally arranged register dials settable to represent the various digits of a dividend, power-operated shifting means for laterally moving the said register in either direction relative to said selection mechanism, an actuating means cyclically operable to enter a value set in said selection mechanism into said dividend register, a sign character control means adjustable to control an additive or subtractive registration in said register upon operation of said actuating means, an automatic division control mechanism effective to control adjustment of said sign character control means and operation of said actuating means and said shifting means to divide a dividend set in said register by a divisor set in said selection mechanism and including means to operate said shifting means at the end of an ordinal series of operations to shift said carriage to the left, and a manually operable control means for initiating operation of the said automatic division mechanism: a dividend restore mechanism for causing the restoration of the dividend into said register upon initiation of said division mechanism whenever the highest order of the divisor is ordinally to the right of the highest order of the dividend when the division operation is initiated comprising the combination of a cycle counter means operable to count a first series of a plural number of subtractive cycles of operation of said actuating means and a second series of a plural number of additive cycles of operation of said actuating means, a normally inoperable drive means cyclically operable to effect operation of said cycle counter means, means controlled by said cycle counter means in response to a predetermined number of said first series of cycles of operation of said actuating means to effect an adjustment of said sign character control means by said division mechanism and thereby enabling operation of said cycle counter means for said second series of cycles of operation, means controlled by said cycle counter means in response to a predetermined number of cycles in said second series of cycles operable to disable operation of said shifting means for shifting said carriage to the left, and a means operated by said cycle counter means in response to a predetermined number of cycles in said second series of cycles to terminate operation of said division mechanism.

4. In a calculating machine adapted to perform division operations having a cyclically operable drive means, an ordinally arranged selection mechanism settable to represent the digits of a divisor, a shiftable carriage, power-operated shifting means for laterally moving the said carriage in either direction relative to said selection mechanism, a register in said carriage containing a plurality of ordinally arranged register dials settable to represent the various digits of a dividend, an actuating means driven by said drive means to enter a value set in said selection mechanism into said register, a sign character control means adjustable to control an additive or subtractive registration in said register upon operation of said actuating means, an automatic division mechanism effective to control adjustment of said sign character control means and operation of said actuating means and said shifting means to divide a dividend set in said register by a divisor set in said selection mechanism and including means to operate said shifting means at the end of each ordinal series of operations to shift said carriage to the left, dividend-divisor aligning means for initiating operation of the said shifting means to move the said carriage toward its rightmost terminal position, means for retaining the said shifting means in such right shift condition for a plurality of machine cycles and operable upon release thereof to initiate operation of said automatic division mechanism, and a shift-terminating means operable to release said retaining means in the rightmost position of said carriage: a dividend restore mechanism for causing the restoration of the dividend into said register upon operation of said shift-terminating means and initiation of said division mechanism in the event the highest orders of the dividend and divisor have not been aligned comprising a cycle counting means, normally ineffective means driven by said drive means for operating said cycle counting means, synchronously with the operation of said actuating means, means controlled by said cycle counting means in response to a predetermined number of a first series of cycles of operation of said actuating means to adjust said sign character control means to reverse the adjustment of said sign character control means by said division mechanism and thereby enable operation of said cycle counting means for a second series of cycles of operation, means controlled by said cycle counting means in response to the same predetermined number of cycles in said second series of cycles to terminate operation of said division mechanism.

5. In a calculating machine adapted to perform division operations having an ordinally arranged selection mechanism settable to represent the digits of a divisor, a shiftable register containing a plurality of ordinally arranged register dials settable to represent the various digits of a dividend, power-operated shifting means for laterally moving the said register in either direction relative to said selection mechanism, a cyclically operable actuating means to enter a value set in said selection mechanism into said register, a sign character control means adjustable to control an additive or subtractive registration in said register upon operation of said actuating means, a division control mechanism including means for adjusting said sign character control means to control a subtractive registration in said register during operation of said actuating means and means responsive to an overdraft in a preselected order for adjusting said sign character control means to control an additive registration in said register during operation of said actuating means to restore the overdraft and then cause operation of said shifting means to shift said reigster to the left, manually operated control means for initiating operation of said shifting means to move said register toward its rightmost terminal position, means for retaining the said shifting means in such right shift condition for a plurality of machine cycles and operable upon release thereof to initiate operation of said division mechanism, a shift-terminating means operable to release said retaining means in a preselected position of said register, and a stop key effective to terminate the division operation at any time: the combination comprising a cycle counter means operable to count a series of subtractive cycles of operation of said actuating means and a series of additive cycles of operation of said actuating means, a normally inoperable drive means operable synchronously with said actuating means to operate said cycle counter means, means controlled by said cycle counter means in response to a predetermined number of said subtractive series of operation to effect a simulated overdraft and thereby an adjustment of said sign character control means by said division mechanism, means controlled by said cycle counter means in response to the predetermined number of cycles in said additive series of operation to disable operation of said shifting means for shifting said carriage to the left, a means operated by said cycle counter means in response to the predetermined number of cycles in said additive series of operation to terminate operation of said division mechanism, a blocking means rendered effective upon operation of said shift-terminating means to temporarily block operation of said stop key, and a means responding to the operation of the said means for terminating operation of said division mechanism to disable said blocking means.

6. In a calculating machine as defined in claim 5 having also an indicating means operated by said means for terminating operation of said division mechanism and operable upon operation thereof to inform an operator of the dividend restored condition of said machine.

7. In a calculating machne adapted to perform division operations having a cyclically operable drive means, an ordinarily arranged selection mechanism settable to represent the digits of a divisor, a shiftable register containing a plurality of ordinarily arranged register dials settable to represent the various digits of a dividend, shifting means for laterally moving the said register in either direction relative to said selection mechanism, actuating means driven by said drive means for entering a value set in said selection mechanism into said register, a sign character control means adjustable to control an additive or subtractive registration in said register upon operation of said actuating means, an overdraft sensing means, a division control mechanism including means for adjusting said sign character control means to control continuous subtractive registrations in said register during operation of said actuating means and means operated by said overdraft sensing means for adjusting said sign character control means to normally control an additive registration in said register to restore the overdraft and then cause operation of said shifting means to shift said register to the left, a division initiatng key, control means operated by said key for initiating operation of said shifting means to move said register toward its rightmost terminal position, means for retaining the said shifting means in such right shift condition for a plurality of machine cycles and operable upon release thereof to initiate operation of said division mechanism, a shift-terminating means operable to release said retaining means in a preselected position of said carriage, and a stop key effective to terminate the division operation: a dividend restore mechanism for causing the restoration of the dividend into said register upon operation of said shift-terminating means and initiation of said division mechanism whenever the highest order of the divisor lies to the right of the highest order of the dividend at the time of such termination comprising a cycle counter means operable to count cycles of operation of said actuating means, a normally inoperable drive means driven by said drive means to operate said cycle counter means, means operated by said cycle counter means after a predetermined number of cycles of operation to simulate an overdraft and thereby effect an adjustment of said sign character control means by said division mechanism, means operated by said cycle counter means in the next cycle of operation to disable operation of said shifting means and retain said sign character control means in its adjusted sign character position, a means operable by said cycle counter means after a second predetermined number of cycles to terminate operation of said machine, a blocking means operated by operation of said shift-terminating means to temporarily block operation of said stop key, a means operated by said operation terminating means for disabling said blocking means, and a means operated by said operation terminating means for informing an operator of the dividend restore condition of said machine.

8. In a calculating machine adapted to perform division operations having a cyclically operable drive means, an ordinarily arranged selection mechanism settable to represent the various digits of a divisor, a shiftable register containing a plurality of ordinarily arranged register wheels settable to represent the various digits of a dividend, shifting mechanism driven by said drive means for moving said register in either direction relative to said selection mechanism including a right shift drive and a left shift drive, actuating means driven by said drive means for entering a value set in said selection mechanism into said register, a sign character control means adjustable to either of two different positions from a normally centralized position to control an additive or subtractive registration in said register upon operation of said actuating means, an overdraft sensing means, a division program mechanism including means for adjusting said sign character control means to control continuous subtractive registrations in said register during operation of said actuating means and means operated by said overdraft sensing means for adjusting said sign character control means to normally control an additive registration in said register to restore the overdraft and then to operate said left shift drive to shift said carriage ordinarily to the left, a division control key, control means operated upon operation of said key for enabling operation of said right shift drive to move said carriage toward its rightmost terminal position, means for maintaining the said right shift drive operative for a plurality of machine cycles and operable upon release thereof to initiate operation of said division mechanism, a shift-terminating member operable to release said holding means in a predetermined right-hand position of said carriage, and a stop key effective to stop the division operation, a dividend reinstating mechanism for causing the reinstatement of a dividend into said register upon operation of the said shift-terminating member and enabling of said division mechanism whenever the highest order of the divistor lies to the right of the highest order of the dividend at the time of initiating division comprising a cycle counter member incrementally adjustable to count cycles of operation of said drive means, means for resiliently biasing said cycle counter means to a normally inoperable position, ratchet means for maintaining said cycle counter means in its plurality of incrementally adjusted positions against the action of the said resilient means, a normally inoperable cycle counter drive means driven by said drive means to operate said cycle counter means, means operated by said shift-terminating member for enabling said cycle counter drive means, a member operated by the said cycle counter means in its eleventh subtractive count position to simulate an overdraft and thereby adjust said sign character control means by said division mechanism, disabling means operated by said cycle counter means in its next position to disable operation of said left shift drive and to retain said sign character control means in its additive position, a terminating mechanism operated by said cycle counter means in its eleventh additive position to terminate operation of said machine, means operated by said left shift drive for disabling said cycle counter drive means, a blocking means rendered effective upon operation of said shift-terminating member to temporarily block the operation of said stop key, means operated by said operation-terminating mechanism for disabling the operation of said blocking means, and means operated by said operation-terminating mechanism for informing an operator of the dividend restored condition of said machine.

9. In a calculating machine as defined in claim 8 comprising also a selectively operable means cooperating with said ratchet means operable to prevent operation of the said ratchet means and thereby disable said dividend reinstating means.

10. In a calculating machine capable of solving problems in division having a keyboard on which the various digits of a divisor may be set, a dividend register containing a plurality of ordinally arranged register dials settable to represent the various digits of a dividend mounted for ordinal shifting movement in either direction on said machine relative to said keyboard, a normally inoperable shifting mechanism for said register including a right shift drive and a left shift drive, a cyclically operable actuating means to enter a value set in said keyboard into said register, a sign character control means adjustable to control an additive or subtractive registration in said register, an automatic division mechanism of the successive subtraction type including means effective to adjust said sign character control means to cause continuous subtractive registrations and an overdraft responsive control means operable to adjust said sign character control means to an additive registration to restore the overdraft and then to cause operation of said left shift drive to shift said carriage to the left, a division initiating key, control means operable upon initiation of sad key for enabling operation of said right shift drive to cause movement of said carriage toward its rightmost terminal position, a latching means for holding the said right shift drive operative for a plurality of machine cycles and operable upon release thereof to cause initiation of said automatic division mechanism, a shift-terminating device operable to release said latching means in a predetermined right-hand position of said carriage, and a stop key effective to stop an automatic division operation: the combination comprising an incrementally positionable cycle counter operable to count cycles of operation of said actuating means, means biasing said cycle counter to a normally inoperable position, a normally inoperable drive means conditioned for operation by said shift-terminating device and thereafter operable synchronously with said actuating means to operate said cycle counter, holding means for maintaining said cycle counter in any one of its operational positions against the action of the said biasing means, a member controlled by said cycle counter in response to a predetermined number of said cycles of operation to operate said overdraft responsive control means to effect an adjustment of said sign character control means by said division mechanism, shift disabling means controlled by said cycle counter means in response to a second predetermined number of cycles of operation to disable operation of said left shift drive, an operation terminating mechanism operable by said cycle counter means in response to said second predetermined number of cycles of operation to terminate operation of said machine, a blocking means rendered effective upon operation of said shift-terminating device to temporarily block the operation of said stop key, means operated by said operation terminating mechanism for disabling the operation of said blocking means, an informative sign means operated by said operation terminating mechanism for informing an operator of the condition of the machine, means operated by said left shift drive for disabling operation of said counter drive means, a means operated concurrently with said operation terminating mechanism to disable operation of said cycle counter whereby a second initiation of said division initiating key is operable to initiate a normal division operation, and a means selectively operable to prevent operation of said holding means.

11. In a calculating machine adapted to perform division operations having an ordinally arranged selection mechanism settable to represent the digits of a divisor, a shiftable register containing a plurality of ordinally arranged register dials settable to represent the various digits of a dividend, drive means for shifting said register in either direction relative to said selection mechanism including a right shift drive and a left shift drive, a cyclically operable actuating means for entering a value set in said selection mechanism into said register, a sign character control means adjustable to control an additive or subtractive registration in said register, an automatic division mechanism effective to control adjustment of said sign character control means and operation of said actuating means and said shifting means to divide a dividend set in said register by a divisor set in said selection mechanism and including means to operate said left shift drive at the end of an ordinal series of operations to shift said carriage to the left, a manually operable control means for initiating operation of the said automatic division mechanism, a dividend-divisor aligner mechanism rendered effective upon the initiation of a division operation including a first disabling means for temporarily disabling said left shift drive and enabling the said right shift drive and for operating said right shift drive in a predetermined cyclic sequence, means for latching said last-mentioned means in said enabling position for a plurality of machine cycles and operable upon release thereof to initiate operation of said automatic division operation, and a latch-releasing means operated by shift of said carriage to a predetermined right-hand position for unlatching said latching means: a dividend restore mechanism for causing the restoration of a dividend into said register upon initiation of said division mechanism whenever the highest order of the divisor lies to the right of the highest order of the dividend at the time of initiation of operation of the division mechanism comprising a cycle counter means operable to count cycles of operation of said actuating means, a normally inoperable drive means cyclically operable to effect operation of said cycle counter means, means controlled by said cycle counter means in response to a predetermined number of a first series of cycles of operation of said actuating means to effect an adjustment of said sign character control means by said division mechanism while continuing operation of said cycle counter means for a second series of cycles of operation, and a second disabling means controlled by said cycle counter means in response to the same predetermined number of cycles in said second series of operations to terminate operation of said division mechanism.

12. In a calculating machine as defined in claim 11 comprising also a stop key effective to selectively terminate the division operation, a blocking means rendered effective upon shift of said carriage to the said predetermined right-hand position to temporarily block operation of said stop key, and a means operated by the operation of said terminating means for disabling the operation of said blocking means.

13. In a calculating machine as defined in claim 11 having also an informative sign means associated with said terminating means and operable upon operation thereof to inform an operator of the restored condition of said machine.

14. In a cyclically operable calculating machine having an ordinally arranged selection mechanism, a register containing a plurality of ordinally arranged register dials, a reversible register drive means operable to enter a value set in said selection mechanism into said register additively or subtractively, a control means for initiating continuous operation of the said machine, a restore mechanism comprising the combination of a sensing means operable to sense a predetermined number of cycles of operation of said register drive means, means operated by said sensing means when sensing said predetermined number of cycles of operation to reverse the sign character of registration by said register drive means, and means operated by the said sensing means when sensing the predetermined number of cycles in the reversed series of operations to terminate operation of said machine.

15. In a cyclically operable calculating machine adapted to perform division operations having an ordinally arranged selection mechanism, a register containing a plurality of ordinally arranged register dials, means for shifting said register in either direction, a cyclically operable reversible register drive means operable to enter a value set in said selection mechanism into said register additively or subtractively, an automatic division mechanism effective to initiate a continuous series of subtractive operations and subsequently terminate such operation and operate said shifting means and said register drive means in a predetermined program to divide a dividend set in said register by a devisor set in said selection mechanism, and a division initiating key, a dividend restore mechanism comprising the combination of a sensing means operable to first sense a predetermined number of subtractive cycles of operation of said register drive means, means conditioned by said key and operated by said sensing means when sensing said predetermined number of said subtractive cycles of operation to reverse the sign character of registration by said register drive means and continuing operation of the register drive means in an additive series of cycles, means operated by the said sensing means when sensing the predetermined number of cycles in said additive series of operations to terminate operation of said machine, and means operated by said shifting means for disabling operation of said sensing means.

16. In a cyclically operable calculating machine adapted to perform division operations having an ordinally arranged selection mechanism, a register containing a plurality of ordinally arranged register dials, means for shifting said register in either direction, a cyclically operated register drive means operable to enter a value set in said selection mechanism into said register, adjustable means for controlling the sign character of a value into said register, an overdraft sensing means, a division mechanism operated by said overdraft sensing means for adjusting said sign character control means to correct the overdraft and then operate the shifting means to shift the register one order to the left, and a manually operable division key for initiating continuous subtractive operation of the said drive means and conditioning said division mechanism for operation, a dividend restore mechanism comprising a sensing means conditioned for operation by said key and operable to first sense a predetermined number of subtractive cycles of operation of said register drive means, means operated by said last-mentioned sensing means to first operate said overdraft sensing means and then hold said sign character control means in its overdraft correcting adjustment while continuing operation of said drive means in corrective cycles of operation, means operated by said last-mentioned sensing means when sensing a like predetermined number of cycles in said corrective operation to terminate operation of said machine, and means operated by said shifting means for disabling operation of said last-mentioned sensing means.

17. In a calculating machine for performing division operations having an ordinally arranged selection mechanism, a register including a series of ordinally arranged numeral dials, means for shifting the said register in either direction relative to said selection mechanism including a right shift drive and a left shift drive, a cyclically operable actuating means for entering a value set in said selection mechanism into said register, a sign character control means adjustable to control additive or subtractive registrations in said register, a division control mechanism including means for adjusting said sign character control means to control subtractive registrations in said register during continuous operation of said actuating means, and an overdraft sensing means for adjusting said sign character control means to control an additive registration in said register during operation of said actuating means to restore the overdraft and then causing operation of said left shift drive to shift said carriage to the left, a manually operable control means, ordinal sensing means for determining the "0" position of said numeral dials in all orders higher than the highest order of said selection mechanism, a stop key effective to terminate the operation of the division control mechanism, a dividend-divisor aligner means operated by said manual control means for operating said right shift drive to shift said register toward its rightmost terminal position, means controlled by said ordinal sensing means and said overdraft sensing means for disabling said dividend-divisor aligner means and enabling said division control mechanism when all of the said numeral dials in all orders higher than the highest orders of said selection mechanism are set at "0" and an overdraft has occurred in said numeral dials, and means operating in response to movement of said register to a predetermined right-hand position for conditioning said left shift drive for a left shift operation: the combination of a dividend restore mechanism for causing the restoration of a dividend into said register upon movement of said register to the predetermined right-hand position and the highest order of the divisor still lies to the right of the highest order of the dividend comprising a cycle counting means operable to count a plural number of cycles of said actuating means, a normally inoperable drive means conditioned for operation upon movement of said register to its predetermined right-hand position and thereafter operable to effect an operation of said cycle counting means, a means operated by movement of said register from its predetermined right-hand position for disabling operation of said drive means, means controlled by said cycle counting means in response to a first series of a predetermined number of cycles of operation of said actuating means to operate said overdraft responsive means and thereby effect an adjustment of said sign character control means for a series of additive registrations in said register, means controlled by said cycle counting means in response to a said first series of cycles of operation to disable operation of said left shift drive, a means operated by said cycle counting means in response to the second series of the predetermined number of cycles to terminate operation of said machine, a blocking means rendered effective upon movement of said register to the predetermined right-hand position for temporarily blocking operation of said stop key, and a means operated by the operation of the said means for terminating operation of said machine to disable said blocking means.

18. In a cyclically operable calculating machine adapted to perform division operations having an ordinally arranged selection mechanism settable to represent the various digits of a divisor, a shiftable carriage, power-operated shifting means for laterally moving the said carriage in either direction relative to said selection mechanism including a right shift clutch and a left shift clutch, a series of ordinally arranged register dials in said carriage settable to represent the various digits of a dividend including a plurality of inboard order dials and a plurality of outboard dials, cyclically operable actuating means for entering a value set in said selection mechanism into said register, a sign character control means adjustable to control additive or subtractive registrations in said register, a tens-transfer mechanism for the inboard order dials for transferring a unit fom a lower order dial to a higher order dial each time a dial passes through "0," means controlled by said tens-transfer mechanism for detecting an overdraft in said inboard order dials, a division control mechanism including means for adjusting said sign character control means to control a subtractive registration in said register during operation of said actuating means, and means responsive to said overdraft detecting means for adjusting said sign character control means to control an additive registration in said register during continuous operation of said actuating means to restore the overdraft and then cause operation of said shifting means to shift said carriage to the left, engaging means operated by said division control mechanism for operating one or the other of said shift clutches whereby said means is positionable in either a right shift clutch-engaging position or a left shift clutch-engaging position, a division control key for initiating said division mechanism control means, means operated by said key for moving said engaging means to its right shift clutch-engaging position and for rendering said division control mechanism operative during sufficient machine cycles to effect shifting of the said carriage toward the right to a predetermined right-hand position, means for sensing the "0" or non-zero setting of said register dials in all orders higher than the highest order of said selection mechanism, means for resiliently urging said shift clutch-engaging means to move from its right shift clutch-engaging position to its left shift clutch-engaging position, means for restraining said engaging means against movement by said urging means for a plurality of machine cycles including a pair of latch members arranged to be disabled by said sensing means and said overdraft detecting means whereby shifting of the carriage to the right will be terminated and shifting to the left commenced upon operation of said overdraft detecting means in response to a true overdraft in said register dials and operable upon release thereof to initiate operation of said division mechanism, and a shift-terminating means operable to release said restraining means in a predetermined position of said carriage: a dividend restore mechanism for causing the restoration of a dividend into said register dials upon operation of the said division mechanism and failure of said overdraft detecting means operating in response to a true overdraft in said register dials and operable whenever the said carriage has been shifted to its predetermined right-hand position comprising the combination of a cycle counter means operable to count a series of a plural number of cycles of operation of said actuating means, a normally inoperable drive means cyclically operable synchronously with said actuating means by a means enabled when said carriage is shifted into its predetermined right-hand position to effect incremental positioning of said cycle counter means, said drive means positioned to its normally inoperable state by said enabling means whenever said carriage is shifted to the left of the said predetermined right-hand position thereof, false overdraft means controlled by said cycle counter means in response to a predetermined number of said series of cycles of operation of said actuating means to effect an operation of said overdraft responsive means and thereby an adjustment of said sign character control means by said division mechanism, a means operable by said cycle counter means in response to the initial cycle subsequent to the cycle in which said false overdraft means was operated to interrupt operation of said left shift clutch to shift said carriage to the left, means operated by said cycle counter means in response to a predetermined number of cycles of said series of cycles to terminate operation of said division control mechanism, and a means operable by said terminating means to inform an operator of the dividend restored condition of said machine.

19. In a calculating machine adapted to perform division operations having a cyclically operable drive means, a shiftable carriage, means for shifting said carriage including a right shift clutch and a left shift clutch, a series of ordinally arranged register wheels in said carriage on which a dividend may be registered including a plurality of inboard order wheels and a plurality of outboard order wheels, means including a keyboard on which a divisor may be set and a differential actuating means cyclically operable by said drive means for entering a value set on said keyboard into said dividend register, a sign character control means adjustable to either of two different positions from a neutral position to control an additive or subtractive registration in said register, a tens-transfer mechanism for the inboard order wheels for transferring a unit from a lower order wheel to a higher order wheel each time a wheel passes through "0," means controlled by said tens-transfer mechanism for detecting a true overdraft in said inboard order wheels, a division program mechanism for operating said machine to perform a division operation through subtract, add-back and shift cycles of operation, control means operated by said overdraft detecting means for controlling the operation of said program mechanism during a division operation, means operated by said program mechanism for engaging one or the other of said shift clutches whereby said means is positionable either a right shift clutch-engaging position or in a left shift clutch-engaging position, a manually operable division initiating key, means controlled by said key for moving said engaging means to its right shift clutch-engaging position and for rendering said program mechanism operative during sufficient machine cycles to effect shifting of the carriage toward the right to a predetermined right-hand position, means for sensing the "0" or non-zero setting of said register wheels in all orders higher than the highest order of said keyboard, means for resiliently urging said engaging means to move from its right shift clutch-engaging position to its left shift clutch-engaging position, means for restraining said engaging means against movement by said urging means, said restraining means including a short latch arranged to the be disabled by said sensing means and a long latch arranged to be disabled by said true overdraft detecting means whereby shifting of the carriage to the right will be terminated and shifting to the left commenced if said sensing means has signified the "0" setting of all of the higher order wheels and said overdraft detecting means is then operated in response to a true overdraft in said register wheels, and a stop key effective to terminate a division operation at any time: a dividened restore mechanism for causing restoration of a dividend into said register wheels upon shift of said carriage to the predetermined right-hand position and initiation of a division operation and upon failure of said overdraft detecting means to detect a true overdraft in said register wheels within a predetermined number of machine cycles, the combination comprising a cycle counting gear operable to count a series of subtractive cycles of operation of said differential actuating means and a series of addition cycles of operation of said differential actuating means, spring means for urging said cycle counting gear to an inoperable position, ratchet means for maintaining said cycle counting gear in a plurality of incrementally operated positions against the urging of the said spring means, cycle counting drive means operated by said drive means to effect incremental movements of said cycle counting gear, a means operated by the positioning of said carriage into and out of its said predetermined position for enabling and disabling respectively said cycle counting drive means, a false overdraft member operated by said cycle counting gear in response to a predetermined number of said series of subtraction cycles of operation to simulate an overdraft of said control means for controlling operation of said division program control mechanism and thereby enabling operation of said cycle counting gear for said series of addition cycles of operation, disabling means controlled by the initial count of said cycle counting gear in response to the said predetermined number of cycles in said addition series of cycles operable to disable operation of said division program mechanism for causing shift of said carriage to the left, an operation terminating mechanism operable by said cycle counting gear in response to a predetermined number of cycles in said addition series of cycles to terminate the division operation, a blocking means cooperating with said carriage operable upon movement of said carriage to the predetermined right-hand position thereof to temporarily block operation of said stop key, a device responding to the operation of said operation terminating mechanism for disabling said blocking means, and an information sign viewable by an operator to inform same of the dividend restored condition of the machine whereby said sign is associated with said operation terminating mechanism and is simultaneously operated therewith.

20. A dividend restore mechanism substantially as claimed in claim 19 also comprising a means operable to continue operation of said ratchet means for holding said cycle counting gear in the final cycle of the predetermined number of cycles in said addition series of cycles whereby a second operation of said division initiating key is operable to initiate a normal division operation subsequent to a dividend restore operation.

21. In a cyclically operable calculating machine having an ordinally arranged selection mechanism, a register containing a plurality of ordinally arranged register dials, drive means for shifting said register in either direction relative to said selection mechanism, a cyclically operated register drive means operable for entering values set in said selection mechanism into said register, a reversible register drive means operable to enter a value set in said selection mechanism either additively or subtractively into said register, an automatic division mechanism effective to control operation of a continuous series of subtractive operations and subsequently terminate such operation and operate said shifting drive means and said register drive means in a predetermined program to divide a dividend set in said register by a divisor set in said selection mechanism, and a division key effective to initiate said program of division operation, a dividend restore mechanism comprising the combination of a cycle sensing means operable to first sense a predetermined number of subtractive cycles of the said register drive means, a means for enabling the operation of said cycle sensing means upon movement of said register into a predetermined position and for disabling the operation of the sensing means upon movement of the register from the said same predetermined position, means operated by said cycle sensing means when sensing said predetermined number of said subtractive cycles of operation to reverse the operation of said register drive means and continue the operation thereof in an additive series of cycles, means operated by the said cycle sensing means when sensing the initial cycle of said predetermined number of additive cycles to disable operation of said shifting drive means, and a means operated by the said cycle sensing means when sensing the predetermined number of cycles in said additive series of cycles in response to a similar number of said subtractive series of cycles to terminate operation of said machine.

22. In a cyclically operable calculating machine having an ordinally arranged selection mechanism, a shiftable register containing a plurality of ordinally arranged register dials, drive means for ordinally shifting said register in either direction relative to said selection mechanism, a cyclically operable digitating means for entering a value set in said selection mechanism into said register, a reversible register drive means operable to operate said digitating means either additively or subtractively, an automatic division mechanism effective to control a series of machine operations including shifting of said register and subsequently terminate such operations in a predetermined program to divide a dividend set in said register by a divisor set in said selection mechanism, and a division initiating key: a dividend restore mechanism operable to restore a dividend into said register whenever the highest order of the divisor lies to the right of the highest order of the dividend when division is initiated comprising the combination of a counting means operable to count a predetermined number of cycles of operation of said actuating means, means operated by a predetermined ordinal position of said register for enabling or disabling the operation of said counting means, means operated by said counting means when counting the said predetermined number of cycles of operation to reverse the operation of the said reversible register drive means, and means operated by the said counting means when counting the said predetermined number of cycles in the reversed series of operations to terminate operation of said machine.

23. In a cyclically operable calculating machine having an ordinally arranged selection mechanism, a shiftable register containing a plurality of ordinally arranged register dials, shifting means for ordinally shifting said register, a reversible cyclically operable digitating means operable to enter a value set in said selection mechanism into said register either additively or subtractively, an automatic division mechanism effective to control a series of machine operations including a subtraction operation to an overdraft and then shifting of said register in a predetermined program to divide a dividend set in said register by a divisor set in said selection mechanism, and a division initiating key: a dividend restore mechanism operable to restore a dividend into said register whenever a predetermined number of subtractions fails to secure an overdraft comprising the combination of a counting means operable to count the predetermined number of subtractive cycles of operation of said actuating means, means operated by said counting means upon counting the said predetermined number of cycles of operation to reverse the operation of the said reversible register drive means, and means operated by the said counting means when counting the said predetermined number of cycles in the reversed series of operations to terminate operation of said machine.

References Cited in the file of this patent
UNITED STATES PATENTS

| | | |
|---|---|---|
| 2,572,922 | Gang | Oct. 30, 1951 |
| 2,653,765 | Machado et al. | Sept. 29, 1953 |
| 2,919,852 | Ellerbeck | Jan. 5, 1960 |

UNITED STATES PATENT OFFICE
CERTIFICATE OF CORRECTION

Patent No. 3,079,076                                    February 26, 1963

Grant C. Ellerbeck

It is hereby certified that error appears in the above numbered patent requiring correction and that the said Letters Patent should read as corrected below.

Column 1, line 56, for "through" read -- though --; column 2, line 7, after "be)" insert a comma; column 22, line 57, for "490" read -- 409 --; column 28, line 2, after "means" insert a comma; line 15, for "presentd" read -- present --; column 35, line 71, for "arms" read -- arm --; column 39, line 56, for 267", second occurrence, read -- 276 --; column 43, line 66, strike out the comma; column 44, line 23, for "reigster" read -- register --; column 46, line 25, before "position" insert -- count --; line 60, for "sad" read -- said --; column 50, line 24, for "fom" read -- from --; column 51, line 46, after "positionable" insert -- in --.

Signed and sealed this 22nd day of October 1963.

(SEAL)
Attest:

ERNEST W. SWIDER
Attesting Officer

EDWIN L. REYNOLDS
Acting Commissioner of Patents